US011260749B2

(12) United States Patent
Petrak et al.

(10) Patent No.: US 11,260,749 B2
(45) Date of Patent: Mar. 1, 2022

(54) COOLING CONTROL SYSTEMS

(71) Applicant: General Electric Company, Schenectady, NY (US)

(72) Inventors: Edward Thomas Petrak, Lawrence Park, PA (US); Jason Strode, Chicago, IL (US); Henry Todd Young, Erie, PA (US); Timothy Warren Brown, Erie, PA (US); Jason Daniel Kuttenkuler, Erie, PA (US); Robert John Zill, Jr., Erie, PA (US); Kenneth Paul Nedley, Lawrence Park, PA (US); Jeffrey John Wolff, Erie, PA (US); Pritamkumar Gangwal, Bangalore (IN); Janaki Gadiyaram, Bangalore (IN); Maryam Abdollahi, Erie, PA (US); Joseph Audu Ishaku, Erie, PA (US); Christian Roland Tollefson, Erie, PA (US); Lindsey Dodis, Erie, PA (US); Shivakumar Katukam, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 213 days.

(21) Appl. No.: 15/276,122

(22) Filed: Sep. 26, 2016

(65) Prior Publication Data

US 2018/0086292 A1    Mar. 29, 2018

(51) Int. Cl.
*B60K 31/00* (2006.01)
*B60K 11/06* (2006.01)
(Continued)

(52) U.S. Cl.
CPC .............. *B60K 31/00* (2013.01); *B60K 11/02* (2013.01); *B60K 11/06* (2013.01); *B60K 11/085* (2013.01);
(Continued)

(58) Field of Classification Search
CPC ........ B60K 31/00; B60K 11/02; B60K 11/06; B60K 11/085; F01P 11/16; F01P 11/18;
(Continued)

(56) References Cited

U.S. PATENT DOCUMENTS 5,301,113 A    4/1994   To et al.
5,526,871 A *  6/1996   Musser ................. G01M 13/00
                                                        165/11.1
(Continued)

FOREIGN PATENT DOCUMENTS

AU    2009264923 A1 *  1/2010  ............... B60L 7/14
CN         1231381 A  * 10/1999  ............... F01P 7/16
(Continued)

OTHER PUBLICATIONS

D. Diepholz, "SCFM, CFM What's the difference?," Tutco-Farnam, accessed Aug. 15, 2016, available at https://farnam-custom.com/resources/engineer-talk/scfm-cfm-whats-the-difference/.
(Continued)

*Primary Examiner* — Behrang Badii
*Assistant Examiner* — Jalal C Coduroglu
(74) *Attorney, Agent, or Firm* — The Small Patent Law Group LLC; John P. Darling

(57) ABSTRACT

Cooling control systems described herein detect decreased operation of a cooling system of a vehicle, restrict movement of the vehicle without stopping movement responsive to decreased operation of the cooling system, and restrict movement of the vehicle by preventing the vehicle from traveling at a speed and/or power output for a non-zero designated period of time. This can allow for the vehicle to continue moving for a temporary period of time to avoid blocking traffic. Other control systems determine predicted distances and/or times that the vehicle can continue moving before coolant in the cooling system decreases below a
(Continued)

designated threshold. Movement of the vehicle can be changed responsive to an upcoming distance and/or time that the vehicle is to travel exceeding the predicted distance and/or time. Other control systems modify a coolant flow rate based on differences between designated and ambient conditions.

20 Claims, 9 Drawing Sheets

(51) Int. Cl.
| | | |
|---|---|---|
| *F01P 11/18* | (2006.01) | |
| *B60K 11/08* | (2006.01) | |
| *B60K 11/02* | (2006.01) | |
| *F01P 11/16* | (2006.01) | |
| *B60W 50/038* | (2012.01) | |

(52) U.S. Cl.
CPC ............ *B60W 50/038* (2013.01); *F01P 11/16* (2013.01); *F01P 11/18* (2013.01); *B60W 2720/10* (2013.01); *F01P 2031/34* (2013.01); *Y02T 10/88* (2013.01)

(58) Field of Classification Search
CPC ............. F01P 2031/34; B60W 50/038; B60W 2720/10; Y02T 10/88
See application file for complete search history.

(56) References Cited

U.S. PATENT DOCUMENTS

| | | | |
|---|---|---|---|
| 5,559,407 A | 9/1996 | Dudley et al. | |
| 5,645,336 A | 7/1997 | Brown et al. | |
| 6,172,602 B1* | 1/2001 | Hasfjord | B60R 16/0234 340/438 |
| 6,305,344 B1* | 10/2001 | Perry | F01P 11/14 123/198 F |
| 6,357,541 B1* | 3/2002 | Matsuda | B60K 6/22 180/68.2 |
| 6,588,272 B2 | 7/2003 | Mulrooney et al. | |
| 6,588,380 B2* | 7/2003 | Ries-Mueller | F01P 7/12 123/41.05 |
| 6,640,168 B2* | 10/2003 | Kastner | F01P 11/14 123/41.08 |
| 6,725,151 B2 | 4/2004 | Itou | |
| 6,772,824 B1* | 8/2004 | Tsuruta | B60K 11/02 123/41.49 |
| 6,829,530 B2* | 12/2004 | Mauro | F01P 5/14 701/114 |
| 6,955,083 B2 | 10/2005 | Fling et al. | |
| 6,981,386 B2* | 1/2006 | Young | B60K 11/06 181/224 |
| 7,000,467 B2 | 2/2006 | Chu et al. | |
| 7,000,685 B2* | 2/2006 | Morishita | B60K 11/02 123/41.1 |
| 7,025,159 B2* | 4/2006 | Smith | G08G 1/017 701/1 |
| 7,103,460 B1* | 9/2006 | Breed | B60C 23/0408 701/29.1 |
| RE39,845 E | 9/2007 | Hasfjord et al. | |
| 7,270,174 B2* | 9/2007 | Chu | G08G 1/017 701/1 |
| 7,461,640 B1* | 12/2008 | Agee | F01P 11/18 123/568.12 |
| 7,497,287 B2* | 3/2009 | Kunikata | B60K 11/04 180/68.1 |
| 7,617,897 B2* | 11/2009 | Hiroshima | B60K 11/02 180/68.4 |
| 7,669,558 B2* | 3/2010 | Claypole | B60K 11/02 123/41.51 |
| 8,069,827 B2* | 12/2011 | Watanabe | B60W 10/30 123/41.02 |
| 8,122,858 B2* | 2/2012 | Fujimoto | F01P 11/16 123/41.1 |
| 8,215,833 B2* | 7/2012 | Kouda | F01P 11/16 374/145 |
| 8,239,095 B2* | 8/2012 | Kikuchi | B60K 6/365 701/36 |
| 8,295,950 B1* | 10/2012 | Wordsworth | B60L 1/003 700/22 |
| 8,316,650 B2* | 11/2012 | Yang | B60H 1/00478 62/3.61 |
| 8,387,728 B1* | 3/2013 | Larke | B60K 1/00 180/65.1 |
| 8,566,016 B2* | 10/2013 | Law | G08G 5/065 701/301 |
| 8,631,771 B2* | 1/2014 | Arnott | F16H 57/0417 123/41.31 |
| 8,763,735 B2* | 7/2014 | Watanabe | H01M 10/6566 180/65.1 |
| 8,875,561 B2 | 11/2014 | Worden et al. | |
| 8,909,398 B2* | 12/2014 | Sawada | B60K 11/02 701/22 |
| 9,151,695 B2* | 10/2015 | Worden | F01P 11/18 |
| 9,586,458 B2* | 3/2017 | Larson | B60H 1/00428 |
| 9,719,409 B2* | 8/2017 | Rollinger | G01F 23/0069 |
| 9,726,069 B2* | 8/2017 | Styron | F01P 11/029 |
| 9,734,712 B1* | 8/2017 | Lai | B61L 25/025 |
| 9,881,430 B1* | 1/2018 | Shah | G01M 15/09 |
| 9,926,833 B2* | 3/2018 | Wolff | B60K 11/085 |
| 10,005,355 B2* | 6/2018 | Brindak | H05K 7/20927 |
| 10,006,337 B2* | 6/2018 | Strode | G01M 3/025 |
| 10,556,598 B2* | 2/2020 | Petrak | B60W 50/14 |
| 2003/0111976 A1* | 6/2003 | Kumar | H02H 7/0852 318/783 |
| 2005/0113988 A1* | 5/2005 | Nasr | B60L 50/61 701/22 |
| 2005/0273218 A1* | 12/2005 | Breed | B60R 21/20 701/2 |
| 2005/0276020 A1* | 12/2005 | Ahmad | B60C 23/041 701/37 |
| 2006/0025897 A1* | 2/2006 | Shostak | G08G 1/017 701/1 |
| 2008/0086253 A1* | 4/2008 | Nakayama | B60T 7/122 701/80 |
| 2009/0105037 A1* | 4/2009 | Hong | B60W 20/50 701/22 |
| 2009/0139781 A1* | 6/2009 | Straubel | B60L 50/64 180/65.1 |
| 2010/0204945 A1* | 8/2010 | Shahi | F25B 49/005 702/100 |
| 2010/0230189 A1* | 9/2010 | Cottrell, V | F01P 7/165 180/65.21 |
| 2011/0253342 A1* | 10/2011 | Lurken | F25D 3/105 165/104.11 |
| 2012/0085511 A1* | 4/2012 | Park | B60K 11/02 165/51 |
| 2013/0201316 A1* | 8/2013 | Binder | H04L 67/12 348/77 |
| 2013/0338899 A1* | 12/2013 | Worden | G01M 3/025 701/101 |
| 2013/0345995 A1 | 12/2013 | Shah et al. | |
| 2014/0117677 A1* | 5/2014 | Fukuzawa | B60W 10/30 290/40 F |
| 2014/0139016 A1* | 5/2014 | Lovercheck | B60L 15/2045 307/9.1 |
| 2014/0180511 A1* | 6/2014 | Daum | B60W 10/08 701/22 |
| 2014/0186732 A1* | 7/2014 | Tachibana | B60L 50/70 429/429 |
| 2014/0338428 A1 | 11/2014 | Bright | |
| 2014/0343821 A1* | 11/2014 | Kim | F01P 7/14 701/101 |
| 2015/0191170 A1* | 7/2015 | Johansson | B60K 31/00 701/94 |
| 2015/0210158 A1* | 7/2015 | Brindak | H05K 7/20927 307/10.1 |

(56) References Cited

U.S. PATENT DOCUMENTS

| | | | |
|---|---|---|---|
| 2015/0267708 A1* | 9/2015 | Masuda | F04D 15/0236 417/45 |
| 2015/0322845 A1* | 11/2015 | Nam | B60T 5/00 123/41.21 |
| 2015/0329119 A1* | 11/2015 | Sujan | F02D 41/042 701/54 |
| 2016/0010537 A1* | 1/2016 | Strode | G01M 3/025 701/114 |
| 2016/0032900 A1* | 2/2016 | Mishima | F03G 6/04 290/36 R |
| 2016/0186647 A1* | 6/2016 | Styron | F01P 11/18 123/41.02 |
| 2016/0230644 A1* | 8/2016 | Dudar | F01P 11/16 |
| 2017/0050633 A1* | 2/2017 | Sato | B60K 11/02 |
| 2017/0217280 A1* | 8/2017 | Larson | B60H 1/00428 |
| 2017/0321593 A1* | 11/2017 | Wolff | B60K 11/04 |
| 2018/0029436 A1* | 2/2018 | Zaeri | B60H 1/3232 |
| 2018/0124181 A1* | 5/2018 | Binder | H04L 67/12 |
| 2018/0141565 A1* | 5/2018 | Petrak | G07C 5/0816 |
| 2019/0152495 A1* | 5/2019 | Altonji | B61C 17/12 |
| 2019/0176862 A1* | 6/2019 | Kumar | G06K 9/00651 |
| 2020/0139983 A1* | 5/2020 | Petrak | G07C 5/0825 |
| 2020/0365015 A1* | 11/2020 | Nguyen | G08G 1/0133 |

FOREIGN PATENT DOCUMENTS

| | | | | |
|---|---|---|---|---|
| CN | 1796166 A | * | 7/2006 | B60G 17/04 |
| CN | 1813370 A | * | 8/2006 | H01M 8/04029 |
| CN | 1816724 A | * | 8/2006 | B60K 11/06 |
| CN | 1957523 A | * | 5/2007 | |
| CN | 101040109 A | * | 9/2007 | F16H 59/72 |
| CN | 101965600 A | * | 2/2011 | G08G 1/096811 |
| CN | 101965601 A | * | 2/2011 | G08G 1/0129 |
| CN | 102219019 A | * | 10/2011 | B60T 7/22 |
| CN | 103687770 A | * | 3/2014 | B60K 31/00 |
| CN | 101965601 B | * | 5/2014 | G08G 1/0141 |
| CN | 101965600 B | * | 8/2014 | G08G 1/096844 |
| CN | 104602926 A | * | 5/2015 | F25D 29/001 |
| CN | 106064617 A | * | 11/2016 | B60L 15/2045 |
| CN | 108705928 A | * | 10/2018 | B60H 1/03 |
| CN | 108803558 A | * | 11/2018 | G01M 17/08 |
| DE | 102012102438 A1 | * | 9/2012 | B60H 1/00735 |
| DE | 102014211045 A1 | * | 12/2014 | B60R 25/06 |
| DE | 102014201510 A1 | * | 7/2015 | B60K 11/02 |
| DE | 102016103888 A1 | * | 9/2016 | B60W 50/0097 |
| ES | 2391556 T3 | * | 11/2012 | B60Q 1/525 |
| FR | 2550809 A1 | * | 2/1985 | E01B 27/17 |
| FR | 2977199 A1 | * | 1/2013 | B60K 11/02 |
| GB | 2534571 A | * | 8/2016 | B60K 28/16 |
| JP | 2015212623 A | * | 11/2015 | |
| KR | 20100113248 A | * | 10/2010 | |
| KR | 20160032153 A | * | 3/2016 | F16H 61/702 |
| WO | WO-2010002644 A1 | * | 1/2010 | B60H 1/3232 |
| WO | WO-2012029178 A1 | * | 3/2012 | G06F 17/00 |
| WO | WO-2012098978 A1 | * | 7/2012 | H02K 9/19 |
| WO | WO-2013191614 A1 | * | 12/2013 | B60T 7/12 |

OTHER PUBLICATIONS

Komatus, Shop Manual, 930E-3 Dump Truck—Part 1, pp. 1-100, accessed Aug. 11, 2016.
Komatus, Shop Manual, 930E-3 Dump Truck—Part 2, pp. 101-200, accessed Aug. 11, 2016.
Komatus, Shop Manual, 930E-3 Dump Truck—Part 3, pp. 201-300, accessed Aug. 11, 2016.
Komatus, Shop Manual, 930E-3 Dump Truck—Part 4, pp. 301-400, accessed Aug. 11, 2016.
Komatus, Shop Manual, 930E-3 Dump Truck—Part 5, pp. 401-500, accessed Aug. 11, 2016.
Komatus, Shop Manual, 930E-3 Dump Truck—Part 6, pp. 501-600, accessed Aug. 11, 2016.
Komatus, Shop Manual, 930E-3 Dump Truck—Part 7, pp. 601-700, accessed Aug. 11, 2016.
Komatus, Shop Manual, 930E-3 Dump Truck—Part 8, pp. 701-800, accessed Aug. 11, 2016.
Komatus, Shop Manual, 930E-3 Dump Truck—Part 9, pp. 801-900, accessed Aug. 11, 2016.
Komatus, Shop Manual, 930E-3 Dump Truck—Part 10, pp. 901-904, accessed Aug. 11, 2016.

* cited by examiner

COOLING CONTROL SYSTEMS

FIELD

Embodiments of the subject matter disclosed herein relate to systems that control and/or monitor operations of cooling systems.

BACKGROUND

Various powered systems may include cooling systems to maintain temperatures of components of the powered systems at safe levels. For example, vehicles may include cooling systems that pump fluid coolant (e.g., liquid coolant or air) through and/or around engines, inverters, transformers, motors, alternators, etc., in order to keep the temperatures of the engines, inverters, transformers, motors, alternators, etc., sufficiently low to prevent damage to these components.

Over time, cooling systems may become damaged and/or fail. Some vehicles may respond to failure in a cooling system by stopping movement of the vehicle. But, this can cause significant problems in some circumstances. For example, the vehicle with a failed cooling system may abruptly stop in a location that blocks movement of other vehicles, such as may occur in a mining operation or along a heavily traveled road.

The coolant in cooling systems may need to be monitored to avoid the powered system operating with too little coolant in the cooling systems. But, for some mobile powered systems, such as vehicles, simply monitoring the amount of coolant in the cooling system may be insufficient. The coolant level may become too low at a time that the vehicle is far from a source or supply of additional coolant.

Monitoring of the amount of coolant and/or the temperature of the coolant in a cooling system can be complicated by factors other than the amount of coolant. When the amount of coolant becomes too low, for example, a pump of the cooling system may ingest air instead of the coolant. This can cause cavitation in the cooling system. Cavitation in the cooling system can cause the pressure of the coolant in the cooling system to significantly decrease, leading to a reduced ability to cool the powered system. As another example, the measured temperature of coolant in a cooling system may be erroneously hot when a heat exchanger, cooling fan, or other component of the cooling system fails.

Some cooling systems use moving air to cool components of the powered system. These cooling systems may include fans (also referred to herein as blowers) that move air across and/or through the components to be cooled. Some powered systems may include blowers that are coupled to a shaft of an engine or alternator that is rotated to generate power for the powered systems, as well as rotate blades of the blowers. Because in such case the blowers are mechanically coupled to and powered by the same engine that powers the rest of the powered system (i.e. power for traction or vehicle propulsion), the blowers can reduce the amount of available power (e.g., horsepower) generated by the engine for the powered system (i.e. traction motors, etc.). The speed at which the blowers operate (e.g., the revolutions per minute of blades of the blowers) can be based on (e.g., a fraction or percentage of) the rotational speed of the shaft of the engine. This relationship between the blower speed and the engine speed can be based on a worst-case-scenario of air density (e.g., air having very low density, such as 1 kilogram per cubic meter) to ensure that a sufficient amount of air is blown across and/or through the components being cooled.

But, in conditions where the air density is greater than the assumed low air density, then the blowers may be operating at an unnecessarily fast speed. This can siphon off more power from the engine of the powered system than is necessary to cool the components of the powered system.

In other cases, blowers may be ac or dc electrical machines driven by motor controllers and/or inverter and power electronics with precision cooling paths independent of one another. For instance, one blower may cool an inverter while another cools a motor. While not directly mechanically coupled to the engine or alternator, these ac or dc machines may still be powered by a common electrical network fed from the same engine-alternator system used to generate tractive or vehicle propulsion power. If these ac or dc blowers are likewise configured to provide sufficient airflow on a worst-cases-scenario air density for component cooling, the ac or dc machines may run at higher speeds than necessary for cooling on higher air density conditions.

BRIEF DESCRIPTION

In one embodiment, a cooling control system includes one or more processors configured to detect decreased operation of a cooling system of a vehicle. The one or more processors also are configured to restrict movement of the vehicle without stopping the movement of the vehicle responsive to detecting the decreased operation of the cooling system. The one or more processors also are configured to restrict the movement of the vehicle by preventing the vehicle from traveling at one or more of a speed or a power output for a non-zero designated period of time.

In one embodiment, another cooling control system includes a first sensor configured to measure an amount of coolant in a cooling system of a vehicle, and one or more processors configured to determine one or more of a predicted distance or a predicted time that the vehicle can continue moving before the amount of coolant in the cooling system decreases below a designated threshold. The one or more processors are configured to compare the one or more of the distance or the time with one or more of an upcoming distance or an upcoming time that the vehicle is to continue moving. The one or more processors also are configured to restrict movement of the vehicle responsive to the one or more of the upcoming distance or the upcoming time exceeding the one or more of the predicted distance or the predicted time.

In one embodiment, a cooling control system includes one or more sensors configured to determine one or more ambient conditions outside of a powered system having a cooling system that moves coolant at a rate to cool one or more components of the powered system. The system also includes one or more processors configured to determine a designated flow rate at which the coolant is to be moved to cool the one or more components at one or more designated conditions outside of the powered system. The one or more processors also are configured to convert the designated flow rate to an ambient condition-based flow rate based on the one or more ambient conditions and to direct one or more actuators of the cooling system to move the coolant through the cooling system at the ambient condition-based flow rate.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
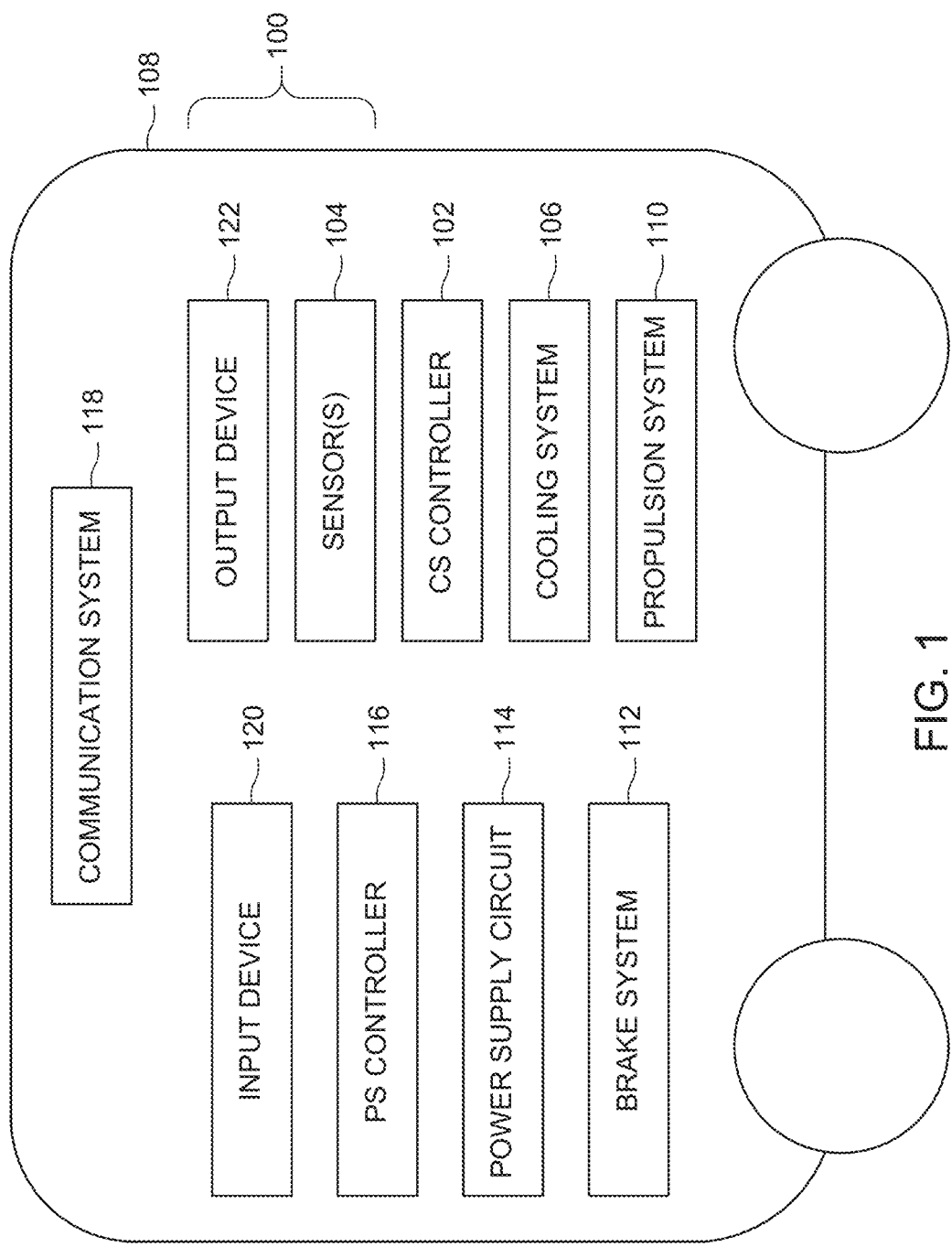
FIG. 1 illustrates one embodiments of a cooling control system.

One or more embodiments of the inventive subject matter described herein provide control systems and methods that monitor operation of cooling systems of powered systems (e.g., vehicles) and that restrict how the powered systems are controlled responsive to detecting a problem (e.g., failure or an insufficient ability to cool) with a cooling system. At least one technical effect of the inventive subject matter described herein is the safe control of a vehicle responsive to identifying a cooling system failure that results in the powered system being moved to a location that does not restrict or block movement of other vehicles while avoiding damage to other components (e.g., the components previously being cooled by the failed cooling system).

Other embodiments of the inventive subject matter described herein provide control systems and methods that monitor coolant levels in cooling systems and predict how much longer a powered system can operate and/or how much farther a powered system can move until the coolant level will become too low to safely operate. Responsive to determining that the powered system will not be able to operate for a sufficiently long time or distance for the powered system to reach a supply or source of additional coolant (or to complete a task of the powered system), the control system and method may change how the powered system operates to increase the predicted time and/or distance. At least one technical effect of this inventive subject matter is to modify how a vehicle is controlled in order to ensure that the remaining amount of coolant in the vehicle is sufficient to allow the vehicle to travel to a location where additional coolant can be added, without increasing the temperature of components cooled by the cooling system above one or more designated temperature thresholds.

Other embodiments of the inventive subject matter described herein provide control systems and methods that determine how much coolant (e.g., air) to move through or across components of the powered system to cool the components, determine an operational setting (e.g., speed) at which to operate the cooling system, and modify or adjust this operational setting based on ambient conditions. At least one technical effect of this inventive subject matter includes modifying speeds at which blowers operate in order to reduce the power consumed by the blowers from an engine while ensuring that the blowers move enough air to cool components of a vehicle. At least one other technical effect of this inventive subject matter includes modifying airflow volume (ACFM) by varying inlet restriction to a blower in order to adjust, vary, or hold constant a desired mass flow (SCFM) of airflow for required component cooling and blower HP minimization and/or optimization.

While the descriptions herein focus on cooling systems operating to cool components of vehicles, not all embodiments are limited to vehicular cooling systems. One or more embodiments may be used with stationary powered systems.

FIG. 1 illustrates one embodiments of a cooling control system 100. The control system includes a cooling system controller 102 ("CS Controller" in FIG. 1) and optionally can include one or more sensors 104 described below. The control system may monitor and/or control operation of a cooling system 106 that cools one or more components of a powered system 108.

The CS controller represents hardware circuitry that includes and/or is connected with one or more processors (e.g., microprocessors, integrated circuits, and/or field programmable gate arrays). The CS controller performs operations described below to monitor and control operations of the cooling system 106. The cooling system may comprise one or more blowers (e.g., fans) that move air and/or pumps that move fluids (e.g., air or a liquid coolant) in order to cool components of the powered system. These components can include parts of a propulsion system 110 (e.g., one or more engines), a brake system 112 (e.g., friction brakes, motors operating as dynamic brakes or regenerative brakes, braking grids, etc.), and/or a power supply circuit 114 (e.g., electric components that create, conduct, and/or transfer electric current to, from, and/or within the powered system). While the powered system is illustrated as a vehicle (e.g., an automobile, a mining vehicle, a rail vehicle, a marine vessel, etc.), the powered system optionally may be a stationary system.

The CS controller can communicate (e.g., via one or more wired and/or wireless connections) with a powered or propulsion/drive system controller 116 ("PS Controller" in FIG. 1) and/or a communication system 118. The PS controller represents hardware circuitry that includes and/or is connected with one or more processors (e.g., microprocessors, integrated circuits, and/or field programmable gate arrays) that control operation of the powered system. For example, the PS controller can restrict throttle settings of the propulsion system (e.g., by not allowing an operator to change the throttle to any available setting or imposing a speed limited vehicle restriction), automatically apply brakes of the braking system, provide an audible and/or visual warning to an operator (e.g., via an output device 122, such as a display, speaker, light, etc.). The communication system communicates with one or more other locations outside of (e.g., off-board) the powered system, such as one or more other powered systems (e.g., vehicles). The communication system can represent transceiving circuitry, such as modems, antennas, etc. An input device 120 of the powered system can represent one or more of a touchscreen (which also may be the output device 122), an electronic mouse, a keyboard, a stylus, a steering wheel, a pedal, a level, a button, a switch, a microphone, etc.

Figure 2A:
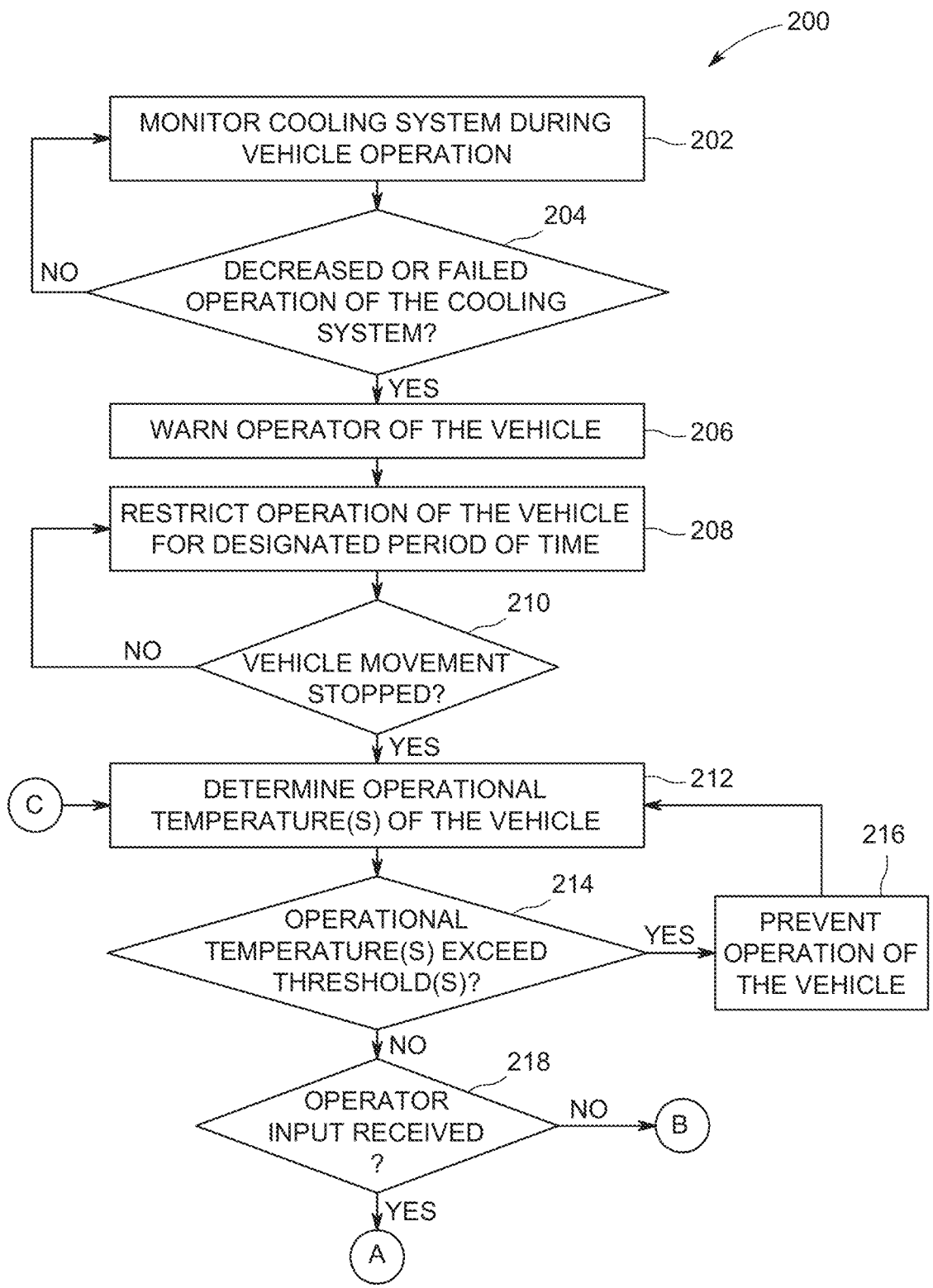
FIGS. 2A and 2B illustrate one embodiment of a method for controlling operation of a powered system based on operation of a cooling system.
Figure 2B:
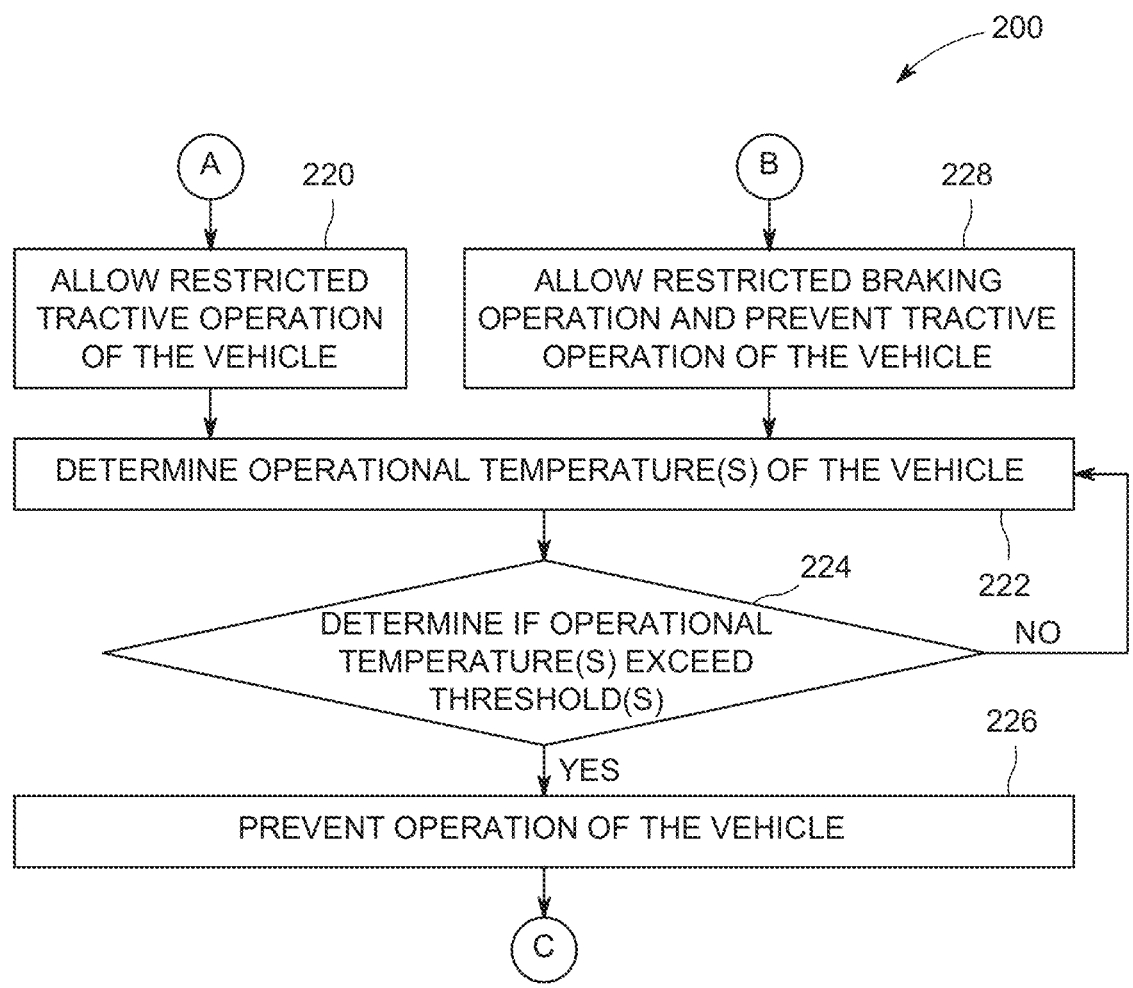

FIGS. 2A and 2B illustrate one embodiment of a method 200 for controlling operation of a powered system based on operation of a cooling system. The method 200 may be used to control operation of the powered system 108 shown in FIG. 1 based on operation of the cooling system 106, also shown in FIG. 1. For example, the method 200 may describe operations performed by the CS controller and/or the PS controller, may represent operations of a software application directing the operations performed by the CS controller and/or the PS controller, and/or may be used to create such a software application. The description of the method 200 focuses on control of the cooling system used to cool components of a vehicle, such as a mining vehicle, but optionally may be used to control the cooling system of another type of vehicle or a non-vehicular powered system.

At 202 (shown in FIG. 2A), one or more characteristics of the cooling system of the vehicle are monitored. The cooling system may be monitored by measuring, sensing, calculating, estimating, or otherwise determining temperatures of the coolant in the cooling system and/or one or more components being cooled by the cooling system. For example, the sensors 104 shown in FIG. 1 may include a temperature sensor (e.g., thermocouple, thermistor, thermometer, or other type of temperature-sensitive device) that measures temperatures of the coolant of the cooling system, the propulsion system of the vehicle, or the like. As another example, the sensors 104 can include a pressure sensor that measures a pressure of the coolant in the cooling system. Optionally, the cooling system may be monitored by measuring or calculating vis software processing and thermal or fluid flow model algorithm constructs a rate at which the coolant is flowing through the cooling system. Additionally or alternatively, the cooling system may be monitored by measuring or calculating via software processing and thermal or fluid flow model algorithm that constructs an amount of coolant in the cooling system.

At 204 (shown in FIG. 2A), a determination is made as to whether the characteristic(s) of the cooling system that are monitored at 202 indicate that the cooling system has failed or that operation of the cooling system has otherwise decreased, that is, the cooling system is not operating at a sufficient level to cool the component(s) of the vehicle (e.g., to designated temperatures, to below designated temperature thresholds, to within designated temperature ranges, etc.). For example, the measured, calculated, or modeled temperatures of the engine, transformer, inverter, etc., of the vehicle may be compared to one or more designated temperature thresholds. Optionally, the measured, calculated, or modeled rate at which the coolant is moving through the cooling system may be compared to a designated rate threshold. Additionally or alternatively, the measured, calculated, or modeled amount of coolant in the cooling system may be compared to a designated threshold amount.

These thresholds may be lower than an upper or lower allowable limits (as appropriate) at which these components can safely operate before failing. For example, the temperature threshold may be a temperature greater than the temperatures at which the vehicle operates during operation of the cooling system without failure of the cooling system and a full amount of coolant, but may be a temperature that is cooler than a temperature at which one or more components of the vehicle would fail. The rate threshold may be slower than the rate at which coolant is moved by the cooling system during normal specification and/or designed operation of the cooling system without failure of the cooling system and a full amount of coolant. The rate threshold may also be slower than the rate at which airflow must be provided for sufficient cooling of downstream components in a given blower's airflow path. The coolant amount threshold may be a lower limit on the amount of coolant that the cooling system can move through the cooling system. The thresholds may also be operating characteristics of a cooling system such as electrical fan horsepower feedback or blower motor drive inverter sensed and/or calculated inputs. For example, a fan horsepower lower than expected at a given fan speed and measured or calculated air density may indicate insufficient airflow and suspect fan blade impeller failure or ducting blockage.

If the measured characteristic(s) exceed or fall below the designated threshold(s), then the measured characteristic(s) may indicate complete or partial failure of the cooling system. For example, if the measured temperature is warmer than the temperature threshold, if the measured rate of coolant flow is slower than the designated rate, and/or if the measured coolant amount falls below the designated coolant amount, then the measured characteristic(s) can indicate that the cooling system is damaged and/or has failed and is unable to safely cool the component(s) of the vehicle. As a result, flow of the method 200 can proceed toward 206 (shown in FIG. 2A) or optionally may proceed toward 208 (shown in FIG. 2A) without performing the operation of 206.

At 206, a warning may be provided to an operator of the vehicle. For example, the CS controller may generate a signal (e.g., the arithmetic logic unit, or ALU, of one or more processors of the CS controller can generate a signal that is conducted through one or more buffers or relays before being conducted into a wire for communication via wired and/or wireless connections) that is communicated to an output device (e.g., display, light, speaker, etc.) that generates a visual and/or audible notification for the operator in order to warn the operator of the problem with the cooling system.

At 208 (shown in FIG. 2A), operation of the vehicle is restricted for a designated, non-zero (e.g., longer than an instant) time period. The CS controller can generate a signal that is communicated to the PS controller (e.g., the arithmetic logic unit, or ALU, of one or more processors of the CS controller can generate a signal that is conducted through one or more buffers or relays before being conducted into a wire for communication via wired and/or wireless connections). This signal may instruct the PS controller to not allow the throttle setting or other operational settings of the vehicle to be changed to cause the vehicle to not travel at a speed above a designated threshold and/or to cause the vehicle to generate power above a designated power threshold. For example, the vehicle may be prohibited from traveling at a speed greater than five miles per hour (e.g., eight kilometers per hour) or another speed limit for some transitory duration regardless of the throttle changes performed by the operator. This can mean that the vehicle does not move faster than the designated speed limit even if the operator increases the throttle to a setting that otherwise would cause the vehicle to move faster than the designated limit. The signal may go as far as to ramp or shutdown the propulsion effort to zero and force the operator to bring the truck to a stop.

Allowing continued movement at the reduced speed limit can allow the operator of the vehicle to continue moving the vehicle, albeit at a slower speed than the vehicle was moving prior to 208, in order to move the vehicle to a location that is out of the way of other vehicles, is in a location where the cooling system can be inspected, and/or is in a location where additional coolant can be added to the cooling system. For non-vehicular powered systems, the method 200 can involve the CS controller communicating a signal to the PS controller that instructs the PS controller to reduce the power output of the powered system for the designated time period At 210 (shown in FIG. 2A), a determination is made as to whether movement (or operation) of the vehicle has stopped. For example, one or more of the sensors can include a tachometer or other speed sensor that determines how fast the vehicle is moving or the powered system is operating. The PS controller can monitor outputs from the sensor (e.g., the ALU of one or more processors of the PS controller can examine signals received via an address bus and one or more buffers or relays from the sensor) in order to determine if the vehicle is still moving. If the vehicle has stopped moving, then flow of the method 200 can proceed toward 212 (shown in FIG. 2A). Otherwise, flow of the method 200 can return toward 208. But, if the designated time period has expired and the vehicle is still moving at 210, then the method 200 optionally can involve automatically (e.g., without operator intervention) stopping movement of the vehicle and proceeding toward 212. Optionally, once stopped, the vehicle may also automatically apply and lock on a parking brake applied once vehicle has been stopped to prevent the operator from moving the vehicle until later step 220.

At 212, one or more operational temperatures of the vehicle are determined. These temperatures may be determined by the sensor(s) measuring temperatures of one or more components (e.g., engine, transformer, inverter, etc.) of the vehicle. The CS controller (e.g., the ALU of one or more processors of the CS controller) can receive the temperatures as signals conducted along an address bus from the sensor(s).

At 214 (shown in FIG. 2A), one or more of the operational temperatures determined at 212 are compared to one or more designated temperature thresholds to determine if the operational temperature(s) exceed the threshold(s). These thresholds may be upper limits on temperatures at which the components of the vehicle can continue to operate for short periods of time (e.g., less than a few minutes) before the components are damaged or destroyed. If the operational temperature(s) exceed the threshold(s), then the temperature(s) may be too hot to continue safe operation of the vehicle. As a result, flow of the method 200 can proceed toward 216 (shown in FIG. 2A).

At 216, continued operation of the vehicle is prevented. For example, the CS controller may provide a signal to the PS controller (e.g., the ALU of one or more processors of the CS controller can write a signal to an address bus connected with the PS controller) that directs the PS controller to prevent the vehicle from moving or operating. In one embodiment, this can cause the vehicle to be turned off or otherwise deactivated. Flow of the method 200 can return toward 212 to continue monitoring the temperatures until the temperatures drop below the threshold(s).

If the operational temperature(s) do not exceed the threshold(s) at 214, then the components of the vehicle may be sufficiently cool to allow continued, albeit limited, operation of the vehicle. As a result, flow of the method 200 can proceed toward 218 (shown in FIG. 2A). At 218, a determination is made as to whether input is received from the operator of the vehicle. For example, the CS controller may determine whether a signal is received (e.g., by an ALU of one or more processors of the CS controller via an address bar and one or more buffers or relays) from the input device subsequent to movement of the vehicle being stopped and the operational temperature(s) of the vehicle being no greater than the threshold(s). This signal may be received from the input device, which may occur responsive to the operator of the vehicle depressing or holding down a button, switch, lever, etc. (as one example). If input is received from the operator, then flow of the method 200 may proceed toward 220 (shown in FIG. 2B). If input is not received from the operator (e.g., within a designated period of time, such as one minute), then flow of the method 200 can proceed toward 228 (shown in FIG. 2B). Additionally, if a parking brake had been locked on applied at step 210 to prohibit truck movement, the brake lock may now be removed at step 220 or step 228 should the operator request restricted operation.

At 220, restricted operation of the powered system is permitted. For example, the CS controller may direct the PS controller (e.g., via one or more signals communicated between ALUs of these controllers) to allow the propulsion system of the vehicle to generate tractive effort to propel the vehicle and/or retard the vehicle with regenerative braking. The operation of the vehicle may be limited by the PS controller not allowing the propulsion system to move the vehicle at more than a designated speed limit or threshold (e.g., five miles per hour or eight kilometers per hour, or another limit) and/or to generate more than a designated amount of power, such as 20% of the maximum torque that the propulsion system is capable of generating to propel the vehicle. The PS controller may restrict operation of the vehicle in this manner regardless of how the operator actuates the input device to control the vehicle.

At 222 (shown in FIG. 2B), one or more operational temperatures of the vehicle are determined. These temperatures may be determined by the sensor(s) measuring temperatures of one or more components (e.g., engine, transformer, inverter, etc.) of the vehicle. The CS controller (e.g., the ALU of one or more processors of the CS controller) can receive the temperatures as signals conducted along an address bus from the sensor(s).

At 224 (shown in FIG. 2B), one or more of the operational temperatures determined at 222 are compared to one or more designated temperature thresholds to determine if the operational temperature(s) exceed the threshold(s). These thresholds may be upper limits on temperatures at which the components of the vehicle can continue to operate for short periods of time (e.g., less than a few minutes, such as three minutes) before the components are damaged or destroyed. If the operational temperature(s) exceed the threshold(s), then the temperature(s) may be too hot to continue safe operation of the vehicle. As a result, flow of the method 200 can proceed toward 226 (shown in FIG. 2B). While at 224 the simple case of temperature being compared to thresholds is used to make decision on temperature inputs, the thresholds may also be more complex algorithms or functions that operate on multiple temperature inputs, or ambient conditions, environmental factors (i.e. weather, altitude, time of day), etc.

At 226, continued operation of the vehicle is prevented. For example, the CS controller may provide a signal to the PS controller (e.g., the ALU of one or more processors of the CS controller can write a signal to an address bus connected with the PS controller) that directs the PS controller to prevent the vehicle from moving or operating. In one embodiment, this can cause the vehicle to be turned off, and/or automatically slowed down to a stop, and/or optionally apply a parking brake once stopped, and/or otherwise deactivated. Flow of the method 200 can return toward 212 (shown in FIG. 2A) to continue monitoring the temperatures until the temperatures drop below the threshold(s).

If the operational temperature(s) do not exceed the threshold(s) at 224, then the components of the vehicle may be sufficiently cool to allow continued, albeit limited, operation of the vehicle. As a result, flow of the method 200 can return toward 222 while the vehicle continues to operate using the restricted operations described in connection with 220.

As described above in connection with 218 (shown in FIG. 2A), if input is not received from the operator, then flow of the method 200 can optionally proceed from 218 toward 228. This may or may not be enabled on all systems. Some systems may always explicitly require operator input for any restricted operation to be allowed. If enabled and option provided for a truck to move in restricted nature without operator input after some timeout duration of waiting for operator input, then at 228, some restricted operation of the powered system may be permitted while other operation of the powered system is prevented. For example, the powered system may be allowed to operate in a manner that does not generate heat but prevented from operating in a manner that generates heat. This may involve the CS controller directing the PS controller (e.g., via one or more signals communicated between ALUs of these controllers) to allow one or more braking system(s) of the vehicle to be used to slow or stop movement of the vehicle (such as when the vehicle is traveling down a decline or is traveling up an incline to prevent the vehicle from moving backward). The CS controller also may direct the PS controller to not allow the propulsion system of the vehicle to generate tractive effort to propel the vehicle. Flow of the method 200 may then proceed toward 222 to monitor the operational temperature(s) of the vehicle, as described above.

The method 200 may be used to control and safely limit operation of a powered system, such as a vehicle, in response to failure or other problems with a cooling system. The method 200 permits the vehicle to continue operating, under certain limitations, so that the vehicle can safely move out of the way of other vehicles and/or to a location where the cooling system can be repaired or receive additional coolant. In one embodiment, responsive to determining that the vehicle is to stop movement and/or not be operated further, the method may involve the controller automatically communicating with one or more other vehicles to request the one or more other vehicles travel to the location of the stopped vehicle and push or tow the stopped vehicle out of the way of other vehicular traffic and/or to a repair facility. Optionally, the method may involve the controller automatically communicating a signal to a secondary cooling system onboard the vehicle to automatically activate the secondary cooling system.

Figure 3:
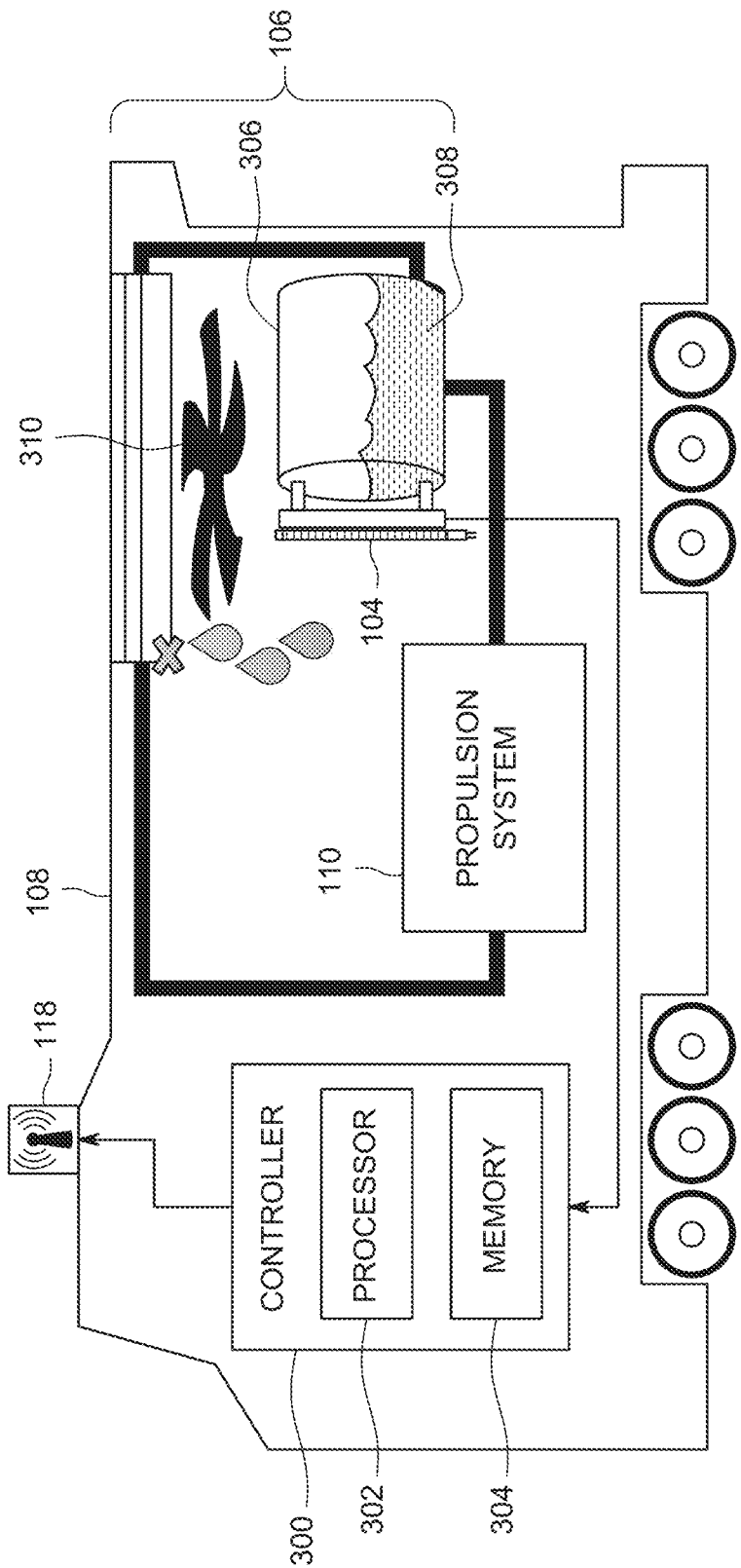
FIG. 3 illustrates another embodiment of the powered system shown in FIG. 1.

FIG. 3 illustrates another embodiment of the powered system 108 shown in FIG. 1. In the illustrated embodiment, the powered system includes a controller 300, which can represent the PS controller, the CS controller, or a combination of the PS controller and the CS controller. The controller(s) include one or more processors 302 (as described above), which can include an internal memory and/or be connected with an external memory 304 (e.g., computer hard drive, optical disc, flash drive, etc.).

In the illustrated embodiment, the cooling system of the powered system includes a coolant tank 306 that holds a coolant 308 and an actuator 310 that moves the coolant (e.g., air, fluid, etc.) across the coolant to cool the air. The actuator 310 may be a fan or blower, a pump, etc. The amount of coolant in the tank can be measured by the sensor 104 which, in FIG. 3, is a level sensor that measures the amount of coolant in the tank and outputs a signal (e.g., a voltage) indicative of the amount of coolant. The sensor may be a magnetic, float, capacitive, hydrostatic pressure sensitive, ultrasonic, microwave, variable resistance sensor, optical, or other type of sensor that can measure the amount of coolant in the tank.

This output signal from the sensor can be processed into a volume of coolant (e.g., in terms of gallons), and may be used for calculating a rate of coolant consumption in terms of a predicted time that the powered system can continue operating and/or a predicted distance that the powered system can continue traveling until the amount of coolant in the tank becomes too low (e.g., decreases below a lower threshold). The controller optionally can activate various engine diagnostic strategies, coupling the data from the level sensor with information gathered from other sensors to drive actions to protect or limit engine operation.

Figure 4:
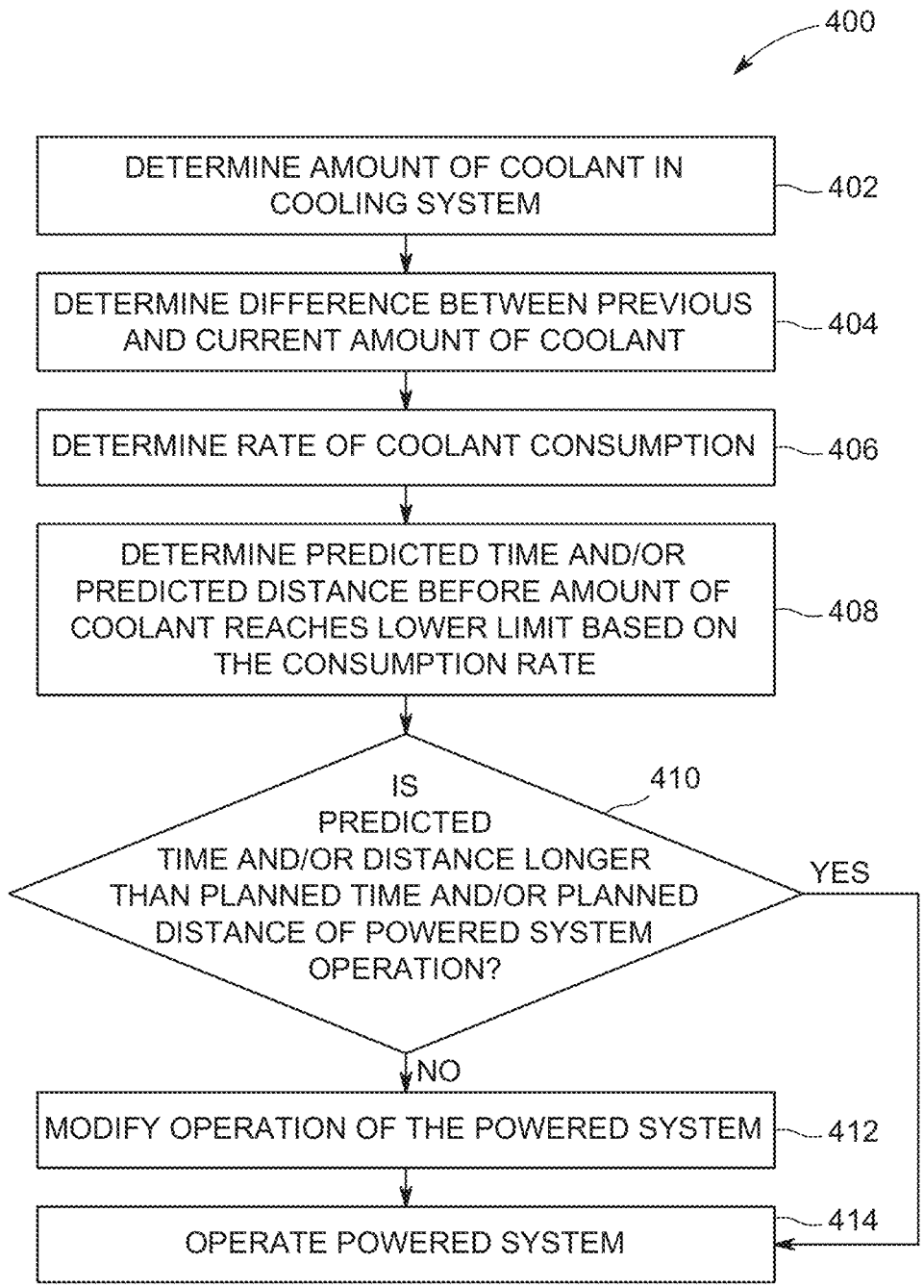
FIG. 4 illustrates a flowchart of one embodiment of a method for controlling operation of a powered system based on an amount of coolant.

FIG. 4 illustrates a flowchart of one embodiment of a method 400 for controlling operation of a powered system based on an amount of coolant. The method 400 may be used to control operation of the powered system based on a rate at which the coolant is consumed by the cooling system. This consumption may be caused by a leak 312 (shown in FIG. 3) in the cooling system and/or usage of the coolant such that the coolant is no longer able to cool the components of the powered system. The method 400 may describe operations performed by the controller, may represent operations of a software application directing the operations performed by the controller, and/or may be used to create such a software application. The description of the method 400 focuses on monitoring of the cooling system and operation of a vehicle, but optionally may be used to monitor the cooling system of another type of vehicle or a non-vehicular powered system.

At 402, an amount of coolant in the cooling system is determined. This amount may be measured by one or more of the sensors and communicated to the controller via one or more wired and/or wireless connections. The amount of coolant may be measured on a periodic, irregular, or on-demand basis during operation of the powered system. For example, during movement of the vehicle, the amount of coolant may be measured once per hour, once per every ten kilometers traveled, etc. The coolant measurements may be stored in the memory for later retrieval, as described below.

At 404, a difference between coolant measurements is determined. For example, a current or most recent measurement of the amount of coolant may be compared to the previous coolant measurement in order to determine how much the amount of coolant has decreased (if at all). The ALU of one or more processors of the controller may access the previously measured coolant level via the address bar(s) of the processors, and the ALU of these one or more processors can compare the recently measured coolant amount with the previously measured coolant amount.

At 406, a rate of coolant consumption is determined. This rate indicates how quickly the amount of coolant in the coolant tank (and/or remainder of cooling system) is decreasing. The rate of coolant consumption can be determined by the controller (e.g., the ALU of one or more processors of the controller) dividing the difference between previous and current measurements of the amount of coolant in the coolant tank by the time between measurements or the distance traveled by the vehicle between the measurements.

For example, if the amount of coolant has decreased by fifteen milliliters between measurements obtained thirty minutes apart, then the rate of coolant consumption can be calculated as thirty milliliters per hour. As another example, if the amount of coolant has decreased by ten milliliters between measurements obtained one hour apart, then the rate of coolant consumption can be calculated as ten milliliters per hour. In another example, if the amount of coolant has decreased by twenty milliliters between measurements obtained ten kilometers apart, then the rate of coolant consumption can be calculated as two milliliters per kilometer. As another example, if the amount of coolant has decreased by thirty milliliters between measurements obtained 100 kilometers apart, then the rate of coolant consumption can be calculated as 0.3 milliliters per kilometer.

At 408, a time that the powered system can continue operating and/or a distance that the powered system can continue traveling is or are predicted based on the consumption rate of the coolant. The predicted time and/or predicted distance can be the time or distance that is calculated to remain before the amount of coolant in the cooling system reaches or drops below a designated threshold. For example, the cooling system may hold ten liters of coolant, the consumption rate of the powered system may be 5 milliliters per hour or 5 milliliters per kilometer, and the threshold amount of coolant may be two liters. The predicted time may be calculated as eight liters (e.g., ten liters of the current or starting amount of coolant minus the threshold of two liters) divided by 0.5 milliliters per hour (e.g., 1.600 hours). The predicted distance may be calculated as 1,600 kilometers (e.g., ten liters of the current or starting amount of coolant minus the threshold of two liters, which is then divided by 0.5 milliliters per kilometer). In one embodiment, the threshold amount of coolant may be no coolant. As a result, this would increase the predicted time to 2,000 hours (e.g., ten liters of coolant divided by 0.5 milliliters per hour) or 2,000 kilometers (e.g., ten liters of coolant divided by 0.5 milliliters per kilometer).

In one embodiment, the controller may determine this predicted time and/or predicted distance and present this prediction to an operator of the powered system (e.g., via the output device). The operator may then decide how to control operation of the powered system, such as by deciding to turn off the powered system, continue operating the powered system, control the powered system to move to a location where additional coolant can be added and/or the cooling system can be inspected and/or repaired (e.g., for leaks).

At 410, a determination is made as to whether the predicted time and/or predicted distance is longer than a planned time and/or a planned distance. The ALU of one or more processors of the controller can compare the predicted time to the planned time to determine if the predicted time is longer, shorter, or the same as the planned time and/or can compare the predicted distance to the planned distance to determine if the predicted distance is longer, shorter, or the same as the planned distance.

The planned time may be a non-zero (e.g., not instantaneous) period of time that the powered system is to continue operating. This time may be the time until a scheduled time of arrival of the powered system to a location. The planned distance may be a non-zero distance that the powered system is to move to reach a location. The location may be a final destination of a vehicle in a scheduled trip, or the location of a repair or inspection facility (where the powered system and/or cooling system can be inspected and/or repaired, and/or additional coolant can be added to the cooling system).

If the predicted time is as long as or longer than the planned time, or the predicted distance is as far as or farther than the planned distance, then the powered system can continue operating with the amount of coolant in the cooling system. As a result, flow of the method 400 can proceed toward 414. But, if the predicted time is shorter than the planned time, or the predicted distance is shorter than the planned distance, then there may not be enough coolant in the cooling system for the powered system to reach the planned time or planned distance. As a result, flow of the method 400 can proceed toward 412.

At 412, operation of the powered system is modified. The operation of the powered system can be modified to change the consumption rate of the coolant or otherwise provide for there to be a sufficient amount of coolant for the powered system to reach the planned time or planned distance. In one embodiment, the controller may restrict operational settings (e.g., throttle settings) of the powered system to a range of settings that cause less heat to be generated by the propulsion system and thereby use less coolant. This restriction may ignore or disregard throttle changes by an operator that would cause the powered system to generate more heat or consume more coolant. For example, the controller may limit the propulsion system to operating with only the lowest 25% or other range of throttle settings.

As another example, the controller may change a movement plan that dictates the operational settings of the powered system for different locations along routes being traveled by the powered system, for different times during a trip of the powered system, and/or for different distances along the routes being traveled. These operational settings may be speeds, throttle settings, brake settings, or other settings of the propulsion system and/or braking system. The operational settings may be modified by reducing the speeds and/or throttle settings dictated by the movement plan to cause the powered system to generate less heat (and consume less coolant) relative to the operational settings prior to modification. These operational settings may be automatically implemented by the controller (e.g., by the ALU of one or more processors comparing a current speed, throttle setting, brake setting, etc., of the powered system with the speed, throttle setting, brake settings, etc., of the movement plan, determining the change in the speed, throttle setting, brake setting, etc. that reduces any difference, and conducts a signal via one or more buffers or switches to the propulsion system and/or brake system). Optionally, these operational settings may be implemented by the controller generating signals communicated to the output device to inform the operator of the powered system how to control the powered system according to the plan.

In another example, the controller may change the movement plan that dictates the routes traveled by the powered system to one or more locations. The movement plan may be changed to automatically cause the powered system to travel to a location (located within the predicted distance or that the powered system is able to reach before expiration of the predicted time) where coolant can be added to the cooling system and/or the cooling system can be inspected and/or repaired. For example, the controller can access a list, table, or other memory structure of locations where coolant can be obtained and/or the cooling system be repaired from the memory. The controller can then modify the movement plan to cause the powered system to travel to at least one of these locations.

At 414, the powered system is operated according to the restrictions determined to ensure that there is sufficient coolant to reach the planned time or planned distance (if applicable). For example, if operations of the powered system were modified at 412, then the powered system can be controlled according to these modified operations. But, if there is a sufficient amount of coolant for the powered system to reach the planned distance or planned time with the amount of coolant onboard the powered system, then the powered system may continue to operate without the operational settings being modified. The ALU of one or more processors of the controller can generate and communicate signals to the propulsion system and/or brake system to automatically control the system, and/or can communicate signals to the output device to instruct the operator of the powered system how to control the powered system to operate. Flow of the method 400 may return toward 402 or may terminate after 414.

Figure 5:
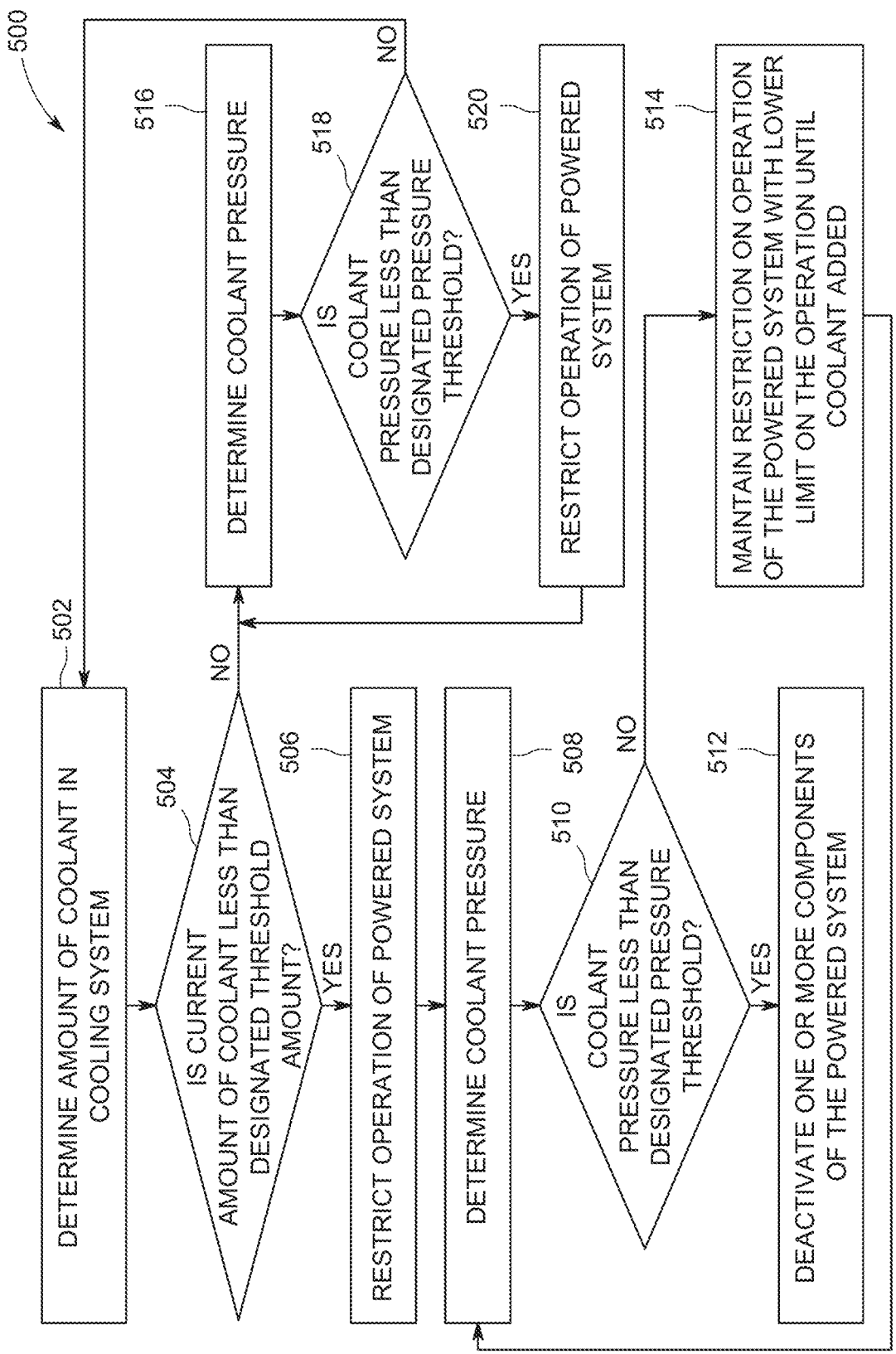
FIG. 5 illustrates a flowchart of one embodiment of a method for controlling operation of a powered system based on inputs from plural sensors.

FIG. 5 illustrates a flowchart of one embodiment of a method 500 for controlling operation of a powered system based on inputs from plural sensors. The method 500 may be used to control operation of the powered system based on characteristics of the powered system that are sensed by two or more of the sensors 104. In one embodiment of the method 500, the sensors include at least a sensor that measured the amount of coolant in the cooling system (as described above) and a sensor that measures a pressure of the coolant in the cooling system. Such a sensor may be a piezoelectric sensor, a capacitive sensor, or other device that is sensitive to changes in pressure in the coolant. As described below, using the inputs provided by multiple sensors can allow for the controller be able to distinguish between low coolant amounts detected by one sensor and incorrect or inaccurate sensor readings of low coolant amounts caused by cavitation in pumps of the cooling system. The method 500 may describe operations performed by the controller, may represent operations of a software application directing the operations performed by the controller, and/or may be used to create such a software application. The description of the method 500 focuses on monitoring of the cooling system and operation of a vehicle, but optionally may be used to monitor the cooling system of another type of vehicle or a non-vehicular powered system.

At 502, the amount of coolant in the cooling system is determined. This amount can be measured by one or more of the sensors, as described above. At 504, a determination is made as to whether the amount of coolant in the cooling system is less than a designated threshold amount. This threshold amount may be a lower limit on the amount of coolant in the cooling system, as described above. If the amount of coolant in the cooling system (e.g., in the tank of the cooling system, in other conduits or the like of the cooling system, or in a combination of the tank and the conduits and other portions of the cooling system) is less than the designated amount, then the cooling system may not have enough coolant to continue safely operating the powered system. For example, the amount of coolant may be so low that continued operation of the powered system may result in damage to one or more components of the powered system.

If the amount of coolant is less than the designated amount, then flow of the method 500 may proceed toward 506. But, if the amount of coolant is at least the designated amount, then flow of the method 500 may proceed toward 516 (described below). Optionally, flow of the method 500 may terminate.

At 506, operation of the powered system is restricted. Similar to as described above, the operational settings of the powered system may be restricted to prevent damage to components of the powered system. For example, the operator may be prevented from changing a throttle position to a setting above a designated threshold (e.g., more than 30% of maximum throttle), the operator may be prevented from increasing power output from the propulsion system, etc.

At 508, pressure of the coolant in the cooling system is determined. In one embodiment, the pressure of coolant in the cooling system is measured by one or more of the sensors. The pressure may be measured in the coolant tank, in the actuator, and/or another conduit or portion of the cooling system. At 510, a determination is made as to whether the coolant pressure determined at 506 is less than a designated threshold. For example, the coolant pressure determined at 508 may be compared to a designated lower limit on coolant pressure.

The designated threshold may be based on an operating state of the powered system. In one embodiment, different operating speeds of the powered system are associated with different thresholds. The operating speeds may be speeds at which an engine of the propulsion system is rotating (e.g., rotating a shaft coupled with an alternator or generator), and different pressure thresholds may be associated with at least some of these different speeds. For example, the pressure thresholds to which the measured coolant pressure is compared may increase or be larger for faster operating speeds of the engine of the powered system than for slower operating speeds of the engine. This can prevent a lower coolant pressure measured during a slow engine speed from being incorrectly identified as a failure or problem of the cooling system when there is no failure or problem with the cooling system that would reduce the coolant pressure. This also can prevent a greater coolant pressure measured during a fast engine speed from being incorrectly identified as a failure or problem of the cooling system when there is no failure or problem with the cooling system that would increase the coolant pressure.

In one embodiment of the method 500, an operating state of the powered system can be changed or otherwise controlled to allow for the comparison of the measured coolant pressure to a designated lower limit or threshold on the coolant pressure. For example, lower engine speeds may result in lower coolant pressures, which can be confused with low coolant pressures that are indicative of problems or failures of the cooling system. In order to avoid low coolant pressure caused by slower engine speeds from being confused with low coolant pressures indicative of a problem or failure with the cooling system, the method 500 may include determining whether the engine speed of the powered system is slower than a designated threshold and, responsive to determining that the engine speed is slower than the threshold, increasing the engine speed to at least the designated threshold. The engine speed may be automatically increased (e.g., by the controller) or may be increased by the controller generating a signal communicated to the output device to direct the operator of the powered system to increase the engine speed. The engine speed may be increased to a speed that does not violate (e.g., exceed) the limit or threshold of 506, or may be temporarily increased to a speed that does violate the limit or threshold of 506, but for a short enough time period to avoid damaging one or more components of the powered system. The coolant pressure may be determined at this increased engine speed, and the coolant pressure compared to the threshold, as described above in connection with 508 and 510.

If the coolant pressure is less than the designated pressure threshold (e.g., as determined by the ALU of one or more processors of the controller comparing the measured pressure to the threshold obtained from the memory via one or more address bars), then the low coolant pressure may be indicative of a need for more coolant and/or a problem with the cooling system. As a result, flow of the method 500 may proceed toward 512. But, if the coolant pressure is not less than the designated pressure, then the measured amount of coolant (obtained at 502) may be indicative of a need for more coolant and not any cavitation or other problem in the cooling system. As a result, flow of the method 500 can proceed toward 514.

At 512, one or more components of the powered system are deactivated. For example, the engine of the powered system may be turned off. The engine can be turned off as protection against the powered system overheating and one or more components of the powered system being damaged.

At 514, the powered system continues to operate subject to the restriction on operation (e.g., as applied at 506), but also operates with a lower limit on operation. For example, the throttle or power output of the powered system may not be allowed to exceed an upper limit (e.g., no more than 30% of maximum throttle or output), but the throttle or power output may be required to be greater than a lower threshold, such as an idle setting of the powered system (e.g., a setting that causes the engine to continue operating but without generating tractive effort). This can allow for any cavitation in the cooling system to be eliminated and low coolant pressure be detected. For example, flow of the method 500 may return toward 508 to proceed in a loop-wise manner until the low coolant pressure is determined (e.g., which may be indicative of cavitation) and the powered system deactivated.

Returning to the description of the method 500 at 504, if the measured amount of coolant does not fall below the designated threshold, then flow of the method 500 may proceed toward 516. At 516, pressure of the coolant in the cooling system is determined. In one embodiment, the pressure of coolant in the cooling system is measured by one or more of the sensors. The pressure may be measured in the coolant tank, in the actuator, and/or another conduit or portion of the cooling system. At 518, a determination is made as to whether the coolant pressure determined at 516 is less than a designated threshold. For example, the coolant pressure determined at 518 may be compared to a designated lower limit on coolant pressure. As described above, the designated threshold may be based on an operating state of the powered system. Optionally, the speed at which the powered system operates may be increased to a speed associated with the designated threshold, also as described above.

If the coolant pressure is less than the designated pressure threshold (e.g., as determined by the ALU of one or more processors of the controller comparing the measured pressure to the threshold obtained from the memory via one or more address bars), then the low coolant pressure may be indicative of a need for more coolant. As a result, flow of the method 500 may proceed toward 520. But, if the coolant pressure is not less than the designated pressure, then there may be sufficient coolant pressure and a sufficient amount of coolant to continue operating the powered system. As a result, flow of the method 500 may return toward 502.

At 520, operation of the powered system is restricted. For example, the powered system may be automatically slowed to an idle speed or setting by the controller, or the operator of the powered system may be directed to decrease the speed or output of the powered system to an idle setting. Flow of the method 500 may return toward 516 so that operation of the powered system at the idle setting until the coolant pressure increases above the threshold.

Figure 6:
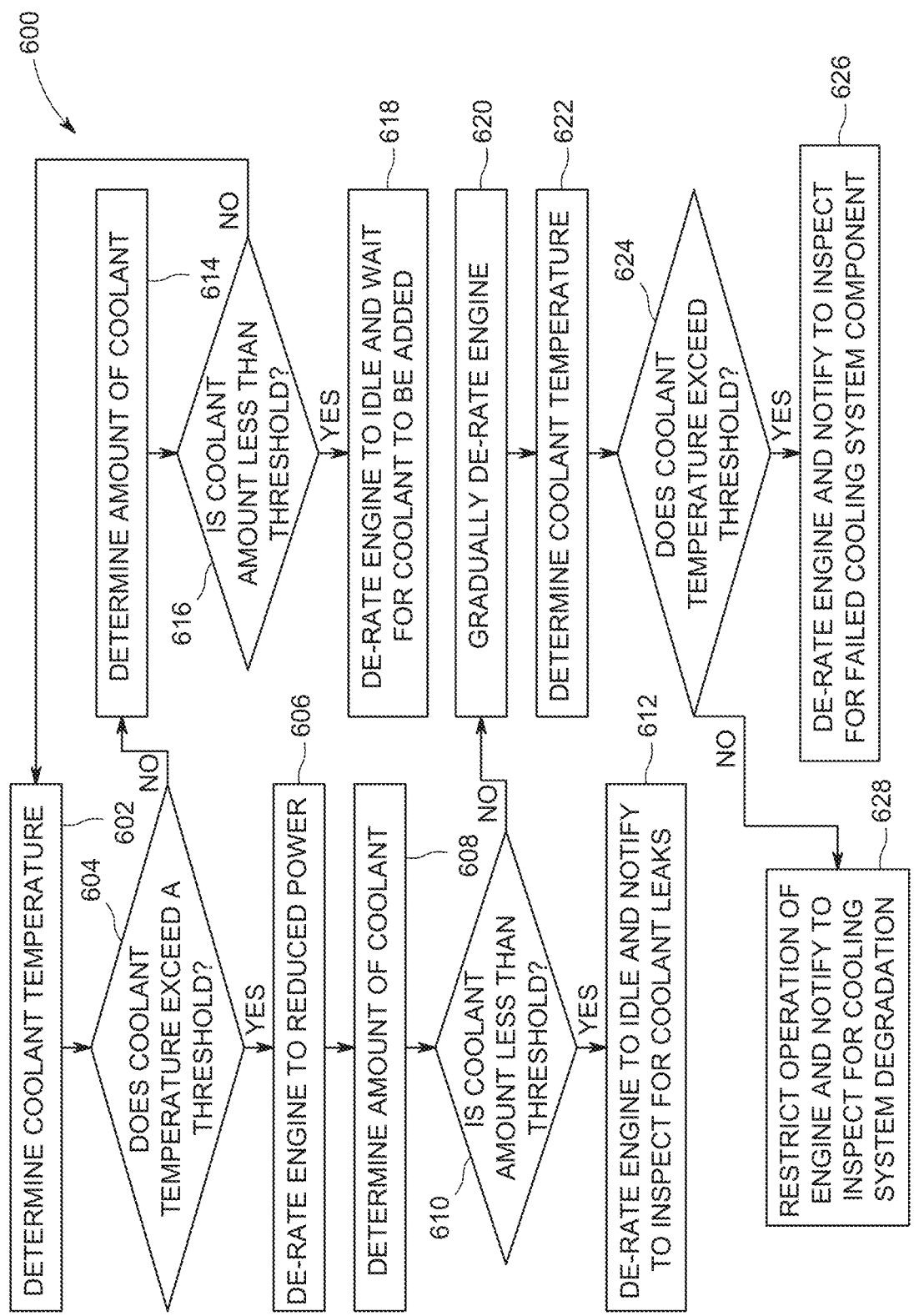
FIG. 6 illustrates a flowchart of one embodiment of another method for controlling operation of a powered system based on inputs from plural sensors.

FIG. 6 illustrates a flowchart of one embodiment of another method 600 for controlling operation of a powered system based on inputs from plural sensors. The method 600 may be used to control operation of the powered system based on characteristics of the powered system that are sensed by two or more of the sensors 104. In one embodiment of the method 600, the sensors include at least a sensor that measured the amount of coolant in the cooling system (as described above) and a sensor that measures a temperature of the coolant in the cooling system. Such a sensor may be a thermometer, a thermistor, a thermocouple, or the like.

In situations where the amount of coolant in the cooling system becomes very small or the cooling system has no coolant, the measured temperature of the coolant may become very hot. But, there may be conditions other than low amounts of coolant that give rise to hot coolant temperatures (or at least the temperatures of the coolant that are measured increasing). As described below, the method 600 can involve measuring the amount of coolant responsive to detecting an elevated coolant temperature. If the amount of coolant is below a designated threshold amount, then the method 600 may detect a potential leak in the cooling system. But, if the amount of coolant is above the designated threshold amount, then the method 600 may determine that there may be another cause of the elevated coolant temperature, such as a problem or failure of one or more components of the cooling system.

At 602, a temperature of the coolant is determined. The coolant temperature may be measured by one or more of the sensors described above. At 604, a determination is made as to whether the coolant temperature exceeds a designated temperature threshold. This threshold may be indicative of coolant temperatures that indicate the amount of coolant is too low and/or that one or more components of the cooling system may not be operating properly. The ALU of one or more processors of the controller may compare the measured coolant temperature with the threshold to determine whether the measured temperature exceeds the threshold. If the coolant temperature exceeds the threshold, then the elevated coolant temperature may indicate that there is a shortage of coolant in the cooling system and/or that the cooling system is not fully operational. As a result, flow of the method 600 can proceed toward 606. But, if the coolant temperature does not exceed the threshold, then flow of the method 600 can proceed toward 614 (described below).

At 606, the powered system continues to operate, but at a decreased output. For example, the engine of the powered system may be de-rated, but continue operating at a speed or setting that is greater than an idle setting. At 608, the amount of coolant in the cooling system is measured, as described above. At 610, a determination is made as to whether the measured amount of coolant is less than a designated threshold amount, also as described above. If the amount of coolant is less than the threshold amount, then the elevated coolant temperature and the small amount of coolant in the cooling system may be indicative of a leak in the cooling system. As a result, flow of the method 600 may proceed toward 612. But, if the amount of coolant is not less than the threshold amount, then the elevated coolant temperature may be indicative of a problem with one or more components of the cooling system. As a result, flow of the method 600 can proceed toward 620 (described below).

At 612, operation of the powered system is decreased and an inspection of the cooling system is recommended. For example, the engine of the powered system may be de-rated to an idle setting (or other setting that reduces power output of the engine) and a signal can be communicated from the controller to the output device to instruct the operator to inspect the cooling system for one or more leaks. The elevated coolant temperature coupled with the small amount of coolant may indicate that coolant is leaking out of the cooling system. Optionally, the controller may communicate a signal to a repair facility to automatically repair or schedule repair of the cooling system.

But, if the measured amount of coolant is not less than the designated threshold amount (e.g., as determined at 610), flow of the method 600 may proceed toward 620. At 620, operation of the powered system is gradually decreased. For example, the engine of the powered system may be gradually de-rated, such as by decreasing the throttle setting and/or power output of the engine over an extended period of time, such as several minutes. The controller of the powered system may automatically decrease the throttle setting and/or power output by generating control signals communicated to the propulsion system to reduce the operation of the engine.

At 622, the temperature of the coolant is measured, as described above. At 624, a determination is made as to whether the measured coolant temperature exceeds the designated threshold temperature, also as described above. If the measured temperature exceeds the designated temperature threshold, then the elevated coolant temperature may indicate that a component of the cooling system needs to be inspected, repaired, and/or replaced. As a result, flow of the method 600 may proceed toward 626. But, if the measured temperature does not exceed the designated temperature threshold, then the previously measured elevated coolant temperature (e.g., at 602 and 604) may indicate that another component of the cooling system needs to be inspected, repaired, and/or replaced. As a result, flow of the method 600 may proceed toward 628.

At 626, operation of the powered system is decreased and an inspection of one or more components of the cooling system is recommended. For example, the engine of the powered system may be de-rated to an idle setting (or other setting that reduces power output of the engine) and a signal can be communicated from the controller to the output device to instruct the operator to inspect the actuator (e.g., fan) of the cooling system, a heat exchanger of the cooling system, or another component, for failure or other problems. Optionally, the controller may communicate a signal to a repair facility to automatically repair or schedule repair of the cooling system.

At 628, operation of the powered system is restricted and an inspection of one or more components of the cooling system is recommended. For example, the engine of the powered system may be allowed to continue operating, but at a reduced range of throttle settings or power outputs, as described above. A signal can be communicated from the controller to the output device to instruct the operator to inspect the cooling system for fouled or damaged heat exchangers or other degradation of the cooling system. Optionally, the controller may communicate a signal to a repair facility to automatically repair or schedule repair of the cooling system.

Returning to the comparison of the measured coolant temperature with the designated temperature threshold at 604, if the measured coolant temperature does not exceed the designated threshold, then flow of the method 604 can proceed toward 614. At 614, the amount of coolant in the cooling system is determined, as described above. At 616, a determination is made as to whether the measured amount of coolant is less than a designated threshold amount, also as described above. If the amount of coolant is less than the threshold amount, then the measured amount of coolant may be indicative of a need to replenish the coolant in the cooling system. As a result, flow of the method 600 may proceed toward 618. But, if the amount of coolant is not less than the threshold amount, then the measured temperature and measured amount of coolant may indicate that the cooling system is operating properly and no additional coolant is needed. As a result, the powered system can continue operating and flow of the method 600 may return toward 602 or terminate.

At 618, operation of the powered system is decreased until additional coolant is added to the cooling system. For example, the engine of the powered system may be de-rated to an idle setting (or other setting that reduces power output of the engine) and a signal can be communicated from the controller to the output device to instruct the operator to add coolant to the cooling system. Optionally, the controller may communicate a signal to a repair facility to automatically replenish or schedule replenishment of coolant in the cooling system.

Figure 7:
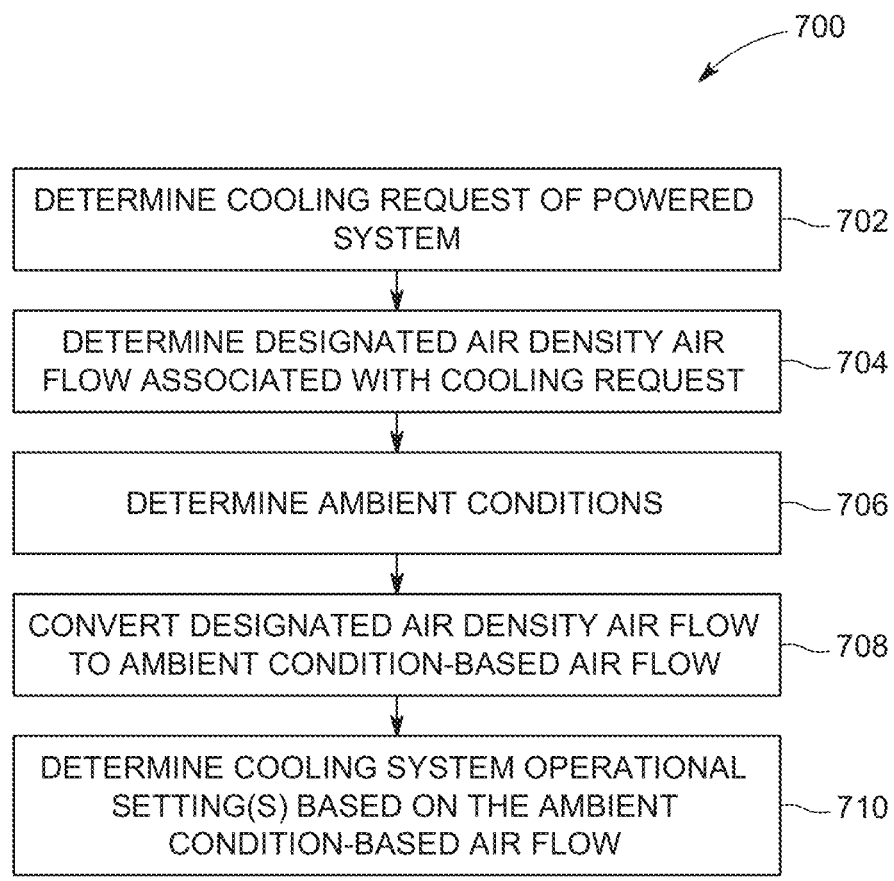
FIG. 7 illustrates a flowchart of one embodiment of a method for controlling operation of a cooling system.

FIG. 7 illustrates a flowchart of one embodiment of a method 700 for controlling operation of a cooling system. The method 700 may be used to determine how much coolant (e.g., air) to move through or across components of the powered system to cool the components, to determine an operational setting (e.g., speed) at which to operate the cooling system, and to modify or adjust this operational setting based on ambient conditions. The method 700 may describe operations performed by the CS controller, may represent operations of a software application directing the operations performed by the CS controller, and/or may be used to create such a software application. The description of the method 700 focuses on control of the cooling system used to cool components of a vehicle, such as a mining vehicle, but optionally may be used to control the cooling system of another type of vehicle or a non-vehicular powered system.

At 702, a cooling request of the powered system is determined. The cooling request represents how much cooling from the cooling system is requested by the powered system. Different amounts of cooling requests may be associated with different operational settings (e.g., throttle settings) of the powered system. The ALU of one or more processors of the CS controller may receive a signal from the input device that indicates the throttle setting and operational mode or state (e.g., braking or propelling), and may then access a table, list, or other memory structure that provides different cooling requests for different combinations of throttle settings, operational modes or states, and/or historical operations of a vehicle.

For example, a first combination of a first throttle setting of a first vehicle operating to propel the first vehicle (e.g., in a tractive or propulsion operational mode or state) may be associated with a first cooling request, a different, second combination of a first throttle setting of a different, second vehicle (having a different history of operations than the first vehicle) operating to propel the second vehicle may be associated with a different, second cooling request, a different, third combination of a different, second throttle setting of the first vehicle operating to propel the first vehicle may be associated with a third cooling request, and so on. The cooling requests may indicate how much thermal energy is to be transferred from the propulsion systems of the vehicle. In one embodiment, the different cooling requests may be determined from measurements of how much cooling was required to keep the propulsion systems of vehicles at or below designated temperatures (e.g., temperatures sufficiently low to prevent or avoid thermal damage) for different combinations of the operational settings.

At 704, a designated air flow associated with the cooling request is determined. The designated air flow can represent a rate of air flow required to cool the given component when the air is at a standard air density. Standard air density is usually defined as an industry standard of 0.075 lbm/ft^3. Different requested mass airflow may be associated with different cooling requests. For example, greater cooling requests (indicating greater amounts of thermal energy needed to be transferred away from components of the powered system) may be associated with greater mass airflow required. The different mass flow rates may be linked with different cooling requests in a table, list, or other memory structure in the memory that the ALU of one or more processors of the controller can access. Based on the cooling request determined at 702, the controller can determine the mass air flow that is associated with the cooling request.

At 706, one or more ambient conditions around the powered system are determined. The ambient conditions may include the temperature, pressure (e.g., barometric pressure), or the like, of the air outside of the powered system. These ambient conditions may be determined in order to calculate or estimate a difference between the density of the air outside of the powered system and the designated density of standard reference air described above, to correlated to mass flow. One or more of the sensors 104 shown in FIG. 1 may measure the ambient conditions and communicate the conditions to the controller.

Following a method of always correcting a measured volumetric airflow (ACFM, actual measured cubic feet per minute) to the before mentioned industry standard 0.075 lbm/ft^3 results in a mass flow type interpretation of airflow or SCFM (standard cubic feet per minute). By definition, at standard air conditions of 0.075 lbm/ft^3, SCFM will always equal ACFM. However, the air around the powered system may be denser than the standardized air density. The denser air may be able to cool the components of the powered system more efficiently than less dense air, or standardized air at 0.075 lbm/ft^3, due to its higher density and effective mass. As a result, the volumetric air flow rate (ACFM) needed to cool the powered system with the air of current ambient conditions may be slower than the volumetric air flow needed to cool the powered system with the air of the standardized air density described above. Hence, by converting SCFM to a ACFM at current air density and scheduling cooling to provide such ACFM the system provides "constant mass flow" of air needed for same cooling capacity. In this manner, at 708, the standardized mass air flow request of air is converted into an actual volumetric quantity of air flow.

Conversely, the air around the powered system may be less dense than the standardized air density. The less dense air may not be able to cool the components of the powered system as efficiently as the denser air of the standardized air density. As a result, the volumetric air flow rate (ACFM) needed to cool the powered system with the air of current ambient conditions may be faster than the volumetric air flow needed to cool the powered system with the air of the standardized air density described above.

The conversion of the air flow from the standardized air density flow ("mass flow" or SCFM) to the measured ambient condition air density flow (volumetric flow or ACFM) may be performed by the controller. The ALU of one or more processors of the controller may examine a table, list, or other memory structure in the memory that associates different air densities with different ambient conditions (e.g., different air pressures, air temperatures, etc.). The ALU(s) can identify the air density associated with the ambient conditions determined at 706.

In one embodiment, the controller can determine the air flow for ambient conditions using the following relationship:

$$ACFM = SCFM * \left(\frac{14.7}{P_{actual}}\right) * \left(\frac{T_{actual} + 273.15}{294.05}\right)$$

where ACFM represents the required volumetric air flow at actual ambient conditions, to meet the SCFM or mass air flow required for adequate cooling, $P_{actual}$ represents the measured air pressure at actual ambient conditions (in units of Psia), and $T_{actual}$ represents the measured air temperature at ambient conditions (in degrees Celsius).

At 710, one or more operational settings of the cooling system are determined based on the air flow for ambient conditions that is determined at 708. These operational settings can be speeds at which different actuators (e.g., blowers or fans) of the cooling system operate, different aperture settings for shutters of one or more actuators (described below), or the like. The controller may refer to a table, list, or other memory structure in the memory that associates different operational settings of the cooling system with different air flows for ambient conditions. These settings may be determined by measuring the air flows generated by the different actuators of the cooling system under different ambient conditions. The controller may then generate control signals to direct the actuators to operate according to these settings that are determined. The controller can repeat the method 700 one or more times to change the speeds at which fans operate based on different operating conditions of the powered system. This can allow for the fans to operate at slower speeds when the ambient air is denser, thereby reducing the amount of power diverted from the propulsion system to the fans, while still cooling the components of the powered system.

In one embodiment, the operational setting that is determined and controlled based on differences between ambient conditions and the designated air density can include a position of a shutter that changes positions or states to allow or block different amounts of coolant (e.g., air) through the actuators (e.g., fans).

Figure 8:
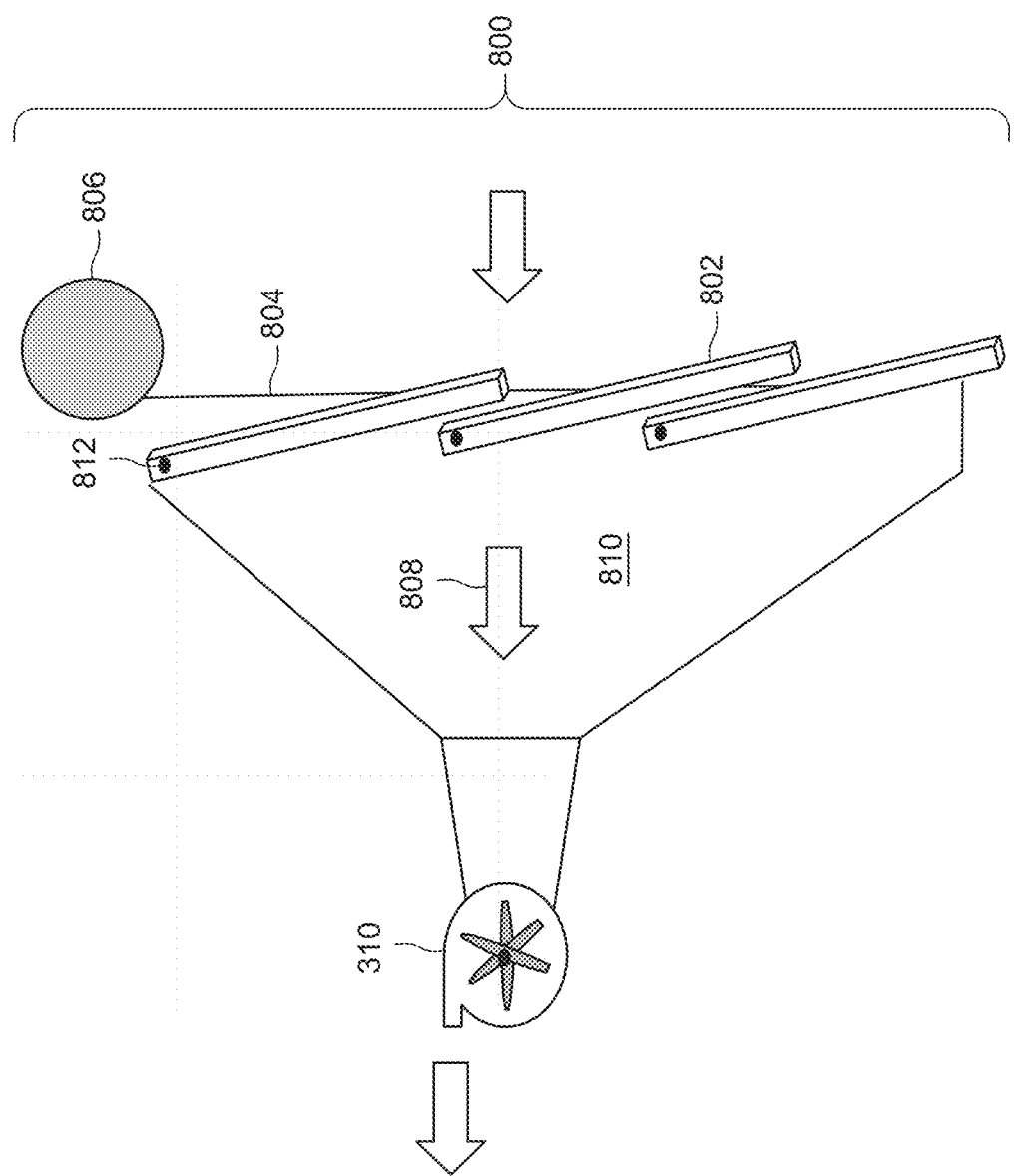
FIG. 8 illustrates one embodiment of a shutter assembly for an actuator of the cooling system shown in FIGS. 1 and 3.

FIG. 8 illustrates one embodiment of a shutter assembly 800 for the actuator 310 of the cooling system 106 shown in FIGS. 1 and 3. The shutter assembly includes several moveable shutters 802 that each pivot about respective pivot points 812. The shutters are connected with an actuation device 806, such as a motor, that moves the shutters to pivot the shutters about or around the pivot points. Between the shutters and the actuator 310 is a sealed plenum 810. The shutters can be moved (e.g., to pivot upward in the example shown in FIG. 8) by the actuation device to allow more air 808 to flow between the shutters and into the plenum relative to the shutters pivoting downward in FIG. 8. The actuator draws the air between the shutters, through the plenum, and out of the blower 310 to cool one or more components of the powered system.

The operational settings that are determined in the method 700 based on differences between a standardized air density and the actual air density (e.g., ambient conditions) can be the position of the shutters. For example, for air that is denser than the designated air density, the controller can generate control signals that direct the actuation device to automatically move the shutters to reduce the space or area through which air can enter into the plenum. This can reduce the air flowing through the blower. For air that is less dense than the designated air density, the controller can generate control signals that direct the actuation device to automatically move the shutters to increase the space or area through which air can enter into the plenum. This can increase the air flowing through the actuator.

While several different methods are separately described herein, at least one embodiment of the controller described herein can concurrently or simultaneously perform two or more of the methods.

In one embodiment, a system (e.g., a cooling control system) includes one or more processors configured to detect decreased operation of a cooling system of a vehicle. The one or more processors also are configured to restrict movement of the vehicle without stopping the movement of the vehicle responsive to detecting the decreased operation of the cooling system. The one or more processors also are configured to restrict the movement of the vehicle by preventing the vehicle from traveling at one or more of a speed or a power output for a non-zero designated period of time.

In one example, the one or more processors are configured to, following expiration of the designated period of time, determine whether the movement of the vehicle has stopped and, responsive to determining that the movement of the vehicle has stopped, the one or more processors are configured to determine whether one or more operational temperatures of the vehicle exceed one or more corresponding designated thresholds. The one or more processors can be configured to prevent the vehicle from moving after the movement of the vehicle has stopped responsive to determining that the one or more operational temperatures exceed the one or more corresponding designated thresholds.

In one example, the one or more operational temperatures include a temperature of one or more of an alternator, a transformer, or an inverter of a power supply circuit of the vehicle.

In one example, the one or more processors are configured to permit the vehicle to begin moving again responsive to determining that the one or more operational temperatures are at or below the one or more corresponding designated thresholds and responsive to detection of an operator actuation of an input device.

In one example, the one or more processors are configured to restrict the movement of the vehicle subsequent to determining that the one or more operational temperatures are at or below the one or more corresponding designated thresholds by preventing the vehicle from traveling at less than one or more of a designated speed or a designated motor torque.

In one example, the one or more processors are configured to permit the vehicle to begin moving again until a temperature of one or more of an alternator, a transformer, or an inverter of a power supply circuit of the vehicle exceeds a designated threshold.

In one embodiment, another cooling control system includes a first sensor configured to measure an amount of coolant in a cooling system of a vehicle, and one or more processors configured to determine one or more of a predicted distance or a predicted time that the vehicle can continue moving before the amount of coolant in the cooling system decreases below a designated threshold. The one or more processors are configured to compare the one or more of the distance or the time with one or more of an upcoming distance or an upcoming time that the vehicle is to continue moving. The one or more processors also are configured to restrict movement of the vehicle responsive to the one or more of the upcoming distance or the upcoming time exceeding the one or more of the predicted distance or the predicted time.

In one example, the one or more processors are configured to restrict the movement of the vehicle to increase the one or more of the predicted distance or the predicted time to greater than the one or more of the upcoming distance or the upcoming time.

In one example, the one or more processors are configured to determine a consumption rate at which the coolant in the cooling system is consumed by the vehicle and to determine the one or more of the predicted distance or the predicted time based on the consumption rate.

In one example, the system also includes a pressure sensor configured to measure a pressure of the coolant in the cooling system. The one or more processors can be configured to restrict the movement of the vehicle responsive to the pressure of the coolant that is measured decreasing below a designated pressure threshold.

In one example, the one or more processors are configured to automatically increase an operating speed of an engine of the vehicle during measurement of the pressure of the coolant.

In one example, the system also includes a temperature sensor configured to measure a temperature of the coolant in the cooling system. The one or more processors are configured to restrict the movement of the vehicle responsive to the temperature of the coolant that is measured exceeding a designated temperature threshold.

In one example, the one or more processors are configured to communicate a warning of a leak in the cooling system responsive to the temperature of the coolant exceeding a designated temperature threshold and the amount of the coolant being less than a designated threshold amount of the coolant.

In one example, the one or more processors are configured to communicate a warning of degradation of one or more components of the cooling system responsive to the temperature of the coolant exceeding a designated temperature threshold and the amount of the coolant being at least as large as a designated threshold amount of the coolant.

In one embodiment, a cooling control system includes one or more sensors configured to determine one or more ambient conditions outside of a powered system having a cooling system that moves coolant at a rate to cool one or more components of the powered system. The system also includes one or more processors configured to determine a designated flow rate at which the coolant is to be moved to cool the one or more components at one or more designated conditions outside of the powered system. The one or more processors also are configured to convert the standard or designated flow rate to an ambient condition-based flow rate based on the one or more ambient conditions and to direct one or more actuators of the cooling system to move the coolant through the cooling system at the ambient condition-based flow rate.

In one example, the rate at which the cooling system moves the coolant is an air flow rate, the standard or designated flow rate is a mass air flow rate, and the ambient condition-based flow rate is a volumetric air flow rate.

In one example, the one or more processors are configured to determine the ambient condition-based volumetric air flow rate to reduce how quickly the coolant is moved through the cooling system due to density of air outside and through the powered system being greater than a standardized or designated air density on which the designated flow rate or "mass flow" is based.

In one example, the one or more sensors are configured to measure a temperature and a pressure of air outside of the powered system as the one or more ambient conditions.

In one example, the one or more actuators of the cooling system include one or more blowers, and the one or more processors are configured to direct a fan or blower speed at which at least one of the blowers is to be operated to hold a constant standardized or designated "mass airflow" (SCFM) based varying the volumetric ambient condition-based flow rate (ACFM).

In one example, the one or more actuators of the cooling system include a blower and a shutter system configured to control an opening through which air can be pulled through the blower and into the cooling system. The one or more processors can be configured to direct the shutter system to change a size of the opening based on maintaining constant standardized or designated "mass airflow" (SCFM) by modulating the volumetric ambient condition-based flow rate (ACFM).

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
one or more processors configured to detect decreased operation of a cooling system of a vehicle while a propulsion system of the vehicle moves the vehicle, the one or more processors also configured to restrict movement of the vehicle without stopping the movement of the vehicle responsive to detecting the decreased operation of the cooling system,
wherein the one or more processors are configured to restrict the movement of the vehicle by preventing the vehicle from traveling at one or more of a speed or a power output for a non-zero designated period of time,
wherein the one or more processors are configured to, following expiration of the designated period of time, determine during operation of the propulsion system whether the movement of the vehicle has stopped and, responsive to determining that the movement of the vehicle has stopped, the one or more processors are configured to determine whether one or more operational temperatures of the vehicle exceed one or more corresponding designated thresholds,
wherein the one or more processors are configured to prevent the vehicle from moving after the movement of the vehicle has stopped responsive to determining that the one or more operational temperatures exceed the one or more corresponding designated thresholds.

2. The system of claim 1, wherein the one or more operational temperatures include a temperature of one or more of an alternator, a transformer, or an inverter of a power supply circuit of the vehicle.

3. The system of claim 1, wherein the one or more processors are configured to permit the vehicle to begin moving again responsive to determining that the one or more operational temperatures are at or below the one or more corresponding designated thresholds and responsive to detection of an operator actuation of an input device.

4. The system of claim 3, wherein the one or more processors are configured to restrict the movement of the vehicle subsequent to determining that the one or more operational temperatures are at or below the one or more corresponding designated thresholds by preventing the vehicle from traveling at less than one or more of a designated speed or a designated motor torque.

5. The system of claim 3, wherein the one or more processors are configured to prevent the vehicle from moving again until a temperature of one or more of an alternator, a transformer, or an inverter of a power supply circuit of the vehicle exceeds a designated threshold.

6. A system comprising:
a first sensor configured to measure an amount of coolant in a cooling system of a vehicle; and
one or more processors configured to determine one or more of a predicted distance or a predicted time that the vehicle can continue moving before the amount of coolant in the cooling system decreases below a designated threshold,
wherein the one or more processors are configured to compare the one or more of the distance or the time with one or more of an upcoming distance or an upcoming time that the vehicle is to continue moving, the one or more processors also configured to restrict movement of the vehicle responsive to the one or more of the upcoming distance or the upcoming time exceeding the one or more of the predicted distance or the predicted time.

7. The system of claim 6, wherein the one or more processors are configured to restrict the movement of the vehicle to increase the one or more of the predicted distance or the predicted time to greater than the one or more of the upcoming distance or the upcoming time.

8. The system of claim 6, wherein the one or more processors are configured to determine a consumption rate at which the coolant in the cooling system is consumed by the vehicle and to determine the one or more of the predicted distance or the predicted time based on the consumption rate.

9. The system of claim 6, further comprising a pressure sensor configured to measure a pressure of the coolant in the cooling system, wherein the one or more processors are configured to restrict the movement of the vehicle responsive to the pressure of the coolant that is measured decreasing below a designated pressure threshold.

10. The system of claim 9, wherein the one or more processors are configured to automatically increase an operating speed of an engine of the vehicle during measurement of the pressure of the coolant.

11. The system of claim 6, further comprising a temperature sensor configured to measure a temperature of the coolant in the cooling system, wherein the one or more processors are configured to restrict the movement of the vehicle responsive to the temperature of the coolant that is measured exceeding a designated temperature threshold.

12. The system of claim 11, wherein the one or more processors are configured to communicate a warning of a leak in the cooling system responsive to the temperature of the coolant exceeding the designated temperature threshold and the amount of the coolant being less than a designated threshold amount of the coolant.

13. The system of claim 11, wherein the one or more processors are configured to communicate a warning of degradation of one or more components of the cooling system responsive to the temperature of the coolant exceeding the designated temperature threshold and the amount of the coolant being at least as large as a designated threshold amount of the coolant.

14. A system comprising:
one or more sensors configured to determine one or more ambient conditions outside of a powered system having a cooling system that moves coolant at a rate to cool one or more components of the powered system; and
one or more processors configured to determine a designated flow rate at which the coolant is to be moved to cool the one or more components, the one or more processors configured to convert the designated flow rate to an ambient condition-based flow rate based on the one or more ambient conditions and to direct one or more actuators of the cooling system to move the coolant through the cooling system at the ambient condition-based flow rate.

15. The system of claim 14, wherein the rate at which the cooling system moves the coolant is an air flow rate, the designated flow rate is a designated air flow rate, and the ambient condition-based flow rate is an ambient condition-based air flow rate.

16. The system of claim 15, wherein the one or more processors are configured to determine the ambient condition-based air flow rate to reduce how quickly the coolant is moved through the cooling system due to density of air outside of the powered system being greater than a designated air density on which the designated flow rate is based.

17. The system of claim 14, wherein the one or more sensors are configured to measure a temperature and a pressure of air outside of the powered system as the one or more ambient conditions.

18. The system of claim 14, wherein the one or more actuators of the cooling system include one or more blowers, and the one or more processors are configured to direct a speed at which at least one of the blowers is to operate based on the ambient condition-based flow rate.

19. The system of claim 14, wherein the one or more actuators of the cooling system include a blower and a shutter system configured to control an opening through which air can be pulled through the blower and into the cooling system, and
wherein the one or more processors are configured to direct the shutter system to change a size of the opening based on the ambient condition-based flow rate.

20. The system of claim 14, wherein the one or more ambient conditions include one or more of a density of air outside of the powered system, a temperature of the air outside of the powered system, or a pressure of the air outside of the powered system.

* * * * *